United States Patent
Gudde et al.

(10) Patent No.: US 8,668,823 B2
(45) Date of Patent: Mar. 11, 2014

(54) METHODS AND UNITS FOR MITIGATION OF CARBON OXIDES DURING HYDROTREATING

(71) Applicant: BP Corporation North America Inc., Houston, TX (US)

(72) Inventors: Nicholas J. Gudde, Windlesham (GB); John W. Shabaker, Naperville, IL (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 13/767,906

(22) Filed: Feb. 15, 2013

(65) Prior Publication Data

US 2013/0149210 A1 Jun. 13, 2013

Related U.S. Application Data

(62) Division of application No. 12/564,075, filed on Sep. 22, 2009, now Pat. No. 8,377,288.

(51) Int. Cl.
*C10G 49/22* (2006.01)

(52) U.S. Cl.
USPC ............ 208/78; 208/80; 208/208 R; 208/213; 208/216 R; 585/469; 585/638; 585/639; 585/640; 585/733; 422/141; 422/143; 422/600; 422/601; 422/650

(58) Field of Classification Search
USPC ............ 422/141, 143, 600, 601, 650; 208/78, 208/80, 208 R–217; 585/302–304, 469, 585/638–640, 733
See application file for complete search history.

(56) References Cited

U.S. PATENT DOCUMENTS

| | | | |
|---|---|---|---|
| 4,992,605 | A | 2/1991 | Craig et al. |
| 5,705,722 | A | 1/1998 | Monnier et al. |
| 6,123,835 | A | 9/2000 | Ackerson et al. |
| 2008/0156694 | A1 | 7/2008 | Chapus et al. |
| 2008/0161614 | A1 | 7/2008 | Bertoncini et al. |
| 2008/0173570 | A1 | 7/2008 | Marchand et al. |
| 2009/0019763 | A1 | 1/2009 | Ghonasgi et al. |
| 2009/0107033 | A1 | 4/2009 | Gudde et al. |
| 2011/0047862 | A1* | 3/2011 | Mayeur et al. .................. 44/307 |
| 2011/0068047 | A1 | 3/2011 | Gudde et al. |
| 2011/0219672 | A1* | 9/2011 | Novak et al. ..................... 44/307 |

FOREIGN PATENT DOCUMENTS

| | | |
|---|---|---|
| EP | 1 396 531 | 3/2004 |
| PL | 285 073 | 5/1999 |
| WO | WO 03/091363 | 11/2003 |

(Continued)

OTHER PUBLICATIONS

Baldauf et al., Processing of Vegetable Oil as Fuel in Mineral Oil Refinery Processes, VDI Report No. 1126 (1004), pp. 153/168.

(Continued)

*Primary Examiner* — Brian McCaig
(74) *Attorney, Agent, or Firm* — Ekkehard Schoettle; Kelly L. Cummings

(57) ABSTRACT

This invention relates to methods and units for mitigation of carbon oxides during hydrotreating hydrocarbons including mineral oil based streams and biological oil based streams. A hydrotreating unit includes a first hydrotreating reactor for receiving a mineral oil based hydrocarbon stream and forming a first hydrotreated product stream, and a second hydrotreating reactor for receiving a biological oil based hydrocarbon stream and forming a second hydrotreated product stream.

6 Claims, 12 Drawing Sheets

(56) References Cited

FOREIGN PATENT DOCUMENTS

| WO | WO 2007/138254 | 12/2007 |
|----|----------------|---------|
| WO | WO 2008/012415 | 1/2008 |
| WO | WO 2008/020048 | 2/2008 |
| WO | WO 2008/040973 | 4/2008 |
| WO | WO 2008/040980 | 4/2008 |
| WO | WO 2008/087279 | 7/2008 |
| WO | WO 2008/119695 | 10/2008 |
| WO | WO 2009/020055 | 2/2009 |
| WO | WO 2009/082366 | 7/2009 |

OTHER PUBLICATIONS

Holmgren et al., A New Development in Renewable Fuels: Green Diesel, NPRA, Annual Meeting, Mar. 18-20, 2007, San Antoinio, TX, pp. 1-2.

* cited by examiner

METHODS AND UNITS FOR MITIGATION OF CARBON OXIDES DURING HYDROTREATING

CROSS-REFERENCE TO RELATED APPLICATIONS

This application is a divisional of U.S. patent application Ser. No. 12/564,075, filed Sep. 22, 2009, now U.S. Pat. No. 8,377,288, all of which is hereby incorporated by reference.

BACKGROUND

1. Technical Field

This invention relates to methods and units for mitigation of carbon oxides during hydrotreating hydrocarbons including mineral oil based streams and biological oil based streams.

2. Discussion of Related Art

Recent air quality issues and production of greenhouse gases has focused improvement efforts on transportation fuels. Efforts to reduce emissions from transportation fuels have led to an increase in hydrotreating at refineries, such as to reduce sulfur content of the transportation fuels. Other efforts focus on renewable sources for transportation fuels, such as to reduce net carbon footprints for transportation of goods, people, and/or services.

However, even with the above technology in transportation fuels, there remains a need and a desire for hydrotreating methods and units that consume less hydrogen, have higher catalytic activity, suffer less catalyst deactivation, provide increased capacity, have reduced capital costs, and can process a variety of feedstocks.

SUMMARY

This invention relates to methods and units for mitigation of carbon oxides while carrying out a hydrotreating process with hydrocarbon streams including mineral oil based streams and biological oil based streams. This invention includes hydrotreating methods and units that consume less hydrogen, have higher catalytic activity, suffer less catalyst deactivation, provide increased capacity, have reduced capital costs, can process a variety of feedstocks, and/or the like.

According to a first embodiment, the invention includes a method of hydrotreating hydrocarbons. The method includes a first step of feeding a mineral oil based hydrocarbon stream to a hydrotreating unit under hydrotreating conditions in the presence of a hydrotreating catalyst to form a hydrotreated product stream. The method includes a second step of measuring a sulfur content of the hydrotreated product stream, and a third step of starting co-feed of a biological oil based hydrocarbon stream to the hydrotreating unit. The method includes a fourth step of measuring the sulfur content of the hydrotreated product stream during co-feed, and a fifth step of stopping co-feed of the biological oil based hydrocarbon stream upon the sulfur content of the hydrotreated product stream reaching a predetermined value. The method includes a sixth step of measuring the sulfur content of the hydrotreated product stream after stopping co-feed. The sulfur content of the hydrotreated product stream returns to a value of close to before the co-feed after the step of stopping the co-feed.

According to a second embodiment, the invention includes a hydrotreating unit for processing mineral oil based hydrocarbon streams, biological oil based hydrocarbon streams, and/or the like. The unit includes a first hydrotreating reactor for receiving a mineral oil based hydrocarbon stream and forming a first hydrotreated product stream, and a second hydrotreating reactor for receiving a biological oil based hydrocarbon stream and forming a second hydrotreated product stream.

According to a third embodiment, the invention includes a hydrotreating unit for processing mineral oil based hydrocarbon streams, biological oil based hydrocarbon streams, and/or the like. The unit includes a hydrotreating reactor for receiving a feed stream and forming a hydrotreated product stream, and a hydrogen recycle system for separating and returning unconverted hydrogen to the hydrotreating reactor as a hydrogen recycle stream. The unit includes a carbon oxide removal system for removing at least a portion of carbon oxides from the hydrogen recycle stream.

BRIEF DESCRIPTION OF THE DRAWING

The accompanying drawings, which are incorporated in and constitute a part of this specification, illustrate embodiments of the invention and, together with the description, serve to explain the features, advantages, and principles of the invention. In the drawings, FIG. 1 schematically shows a hydrotreating unit, according to one embodiment.

DETAILED DESCRIPTION

Figure 1:
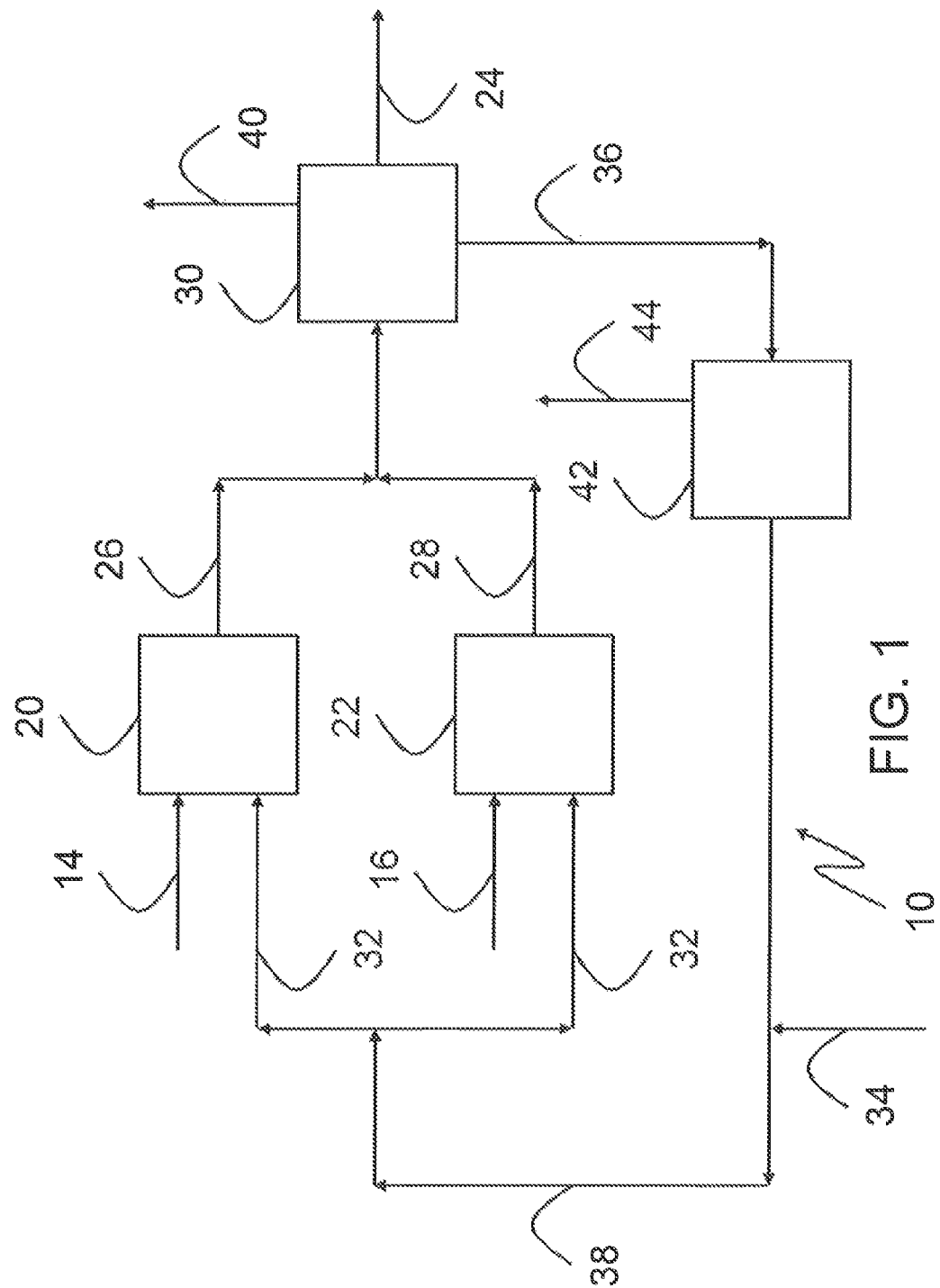

This invention relates to methods and units for mitigation of carbon oxides while carrying out a hydrotreating process with hydrocarbon streams including mineral oil based streams and/or biological oil based streams.

Triglycerides and other suitable biologically derived feedstocks can be converted into transportation fuel components, such as biogasoline, biodiesel, and/or biodistillate. Triglycerides can include a range of natural materials formed from esterification of fatty acids and/or glycerol, such as vegetable oils, animal fats, and/or the like. Coprocessing of natural oils and/or fats with fractions of crude oil, such as, gas oil in a hydrotreater can be a convenient way of converting the natural oils and/or fats in to a transportation fuel.

In an oil refinery, hydrotreaters may perform chemical conversions and/or reactions, such as hydrodesulfurization, hydrodenitrogenation, hydrodearomatization, and/or the like. These chemical conversions can be used for production of clean and/or low sulfur transportation fuels. A suitable catalyst used for hydrotreating can include cobalt and molybdenum on an alumina support. During coprocessing of natural oils and/or fats, the catalyst can also perform hydrodeoxygenation.

Co-feeding natural oils and/or fats to petroleum hydrotreating processes can result in a loss of activity (deactivation and/or inhibition) of the catalyst. According to one embodiment, the invention relates to recovery of desulfurization activity of a hydrodesulfurization catalyst, when used in coprocessing mineral oil and/or biological oil (bio-oil) by periodically turning off the bio-oil feed. The presence of bio-oil can cause and/or show the following observable effects: an initial increase in sulfur levels of the product hydrocarbons followed by a more gradual continuing increase in sulfur levels. Once the bio-oil feed ceases, the original sulfur levels in the product can be restored.

Desirably, a balance between sulfur levels in a product and the ability to coprocess biological oil in existing refinery hydrotreatment equipment can be achieved by operating the process in a campaign-type mode, where addition of bio-oil only occurs periodically, intermittently, and/or cyclically.

Generally during processing bio-oil, increased hydrotreating process effluent sulfur content can be observed for cobalt molybdenum containing catalysts (generally low pressure hydrodesulfurization service), but sulfur content may be at least relatively stable with nickel molybdenum containing catalysts (generally high pressure hydrodesulfurization service). The methods and techniques of the invention can be applied to any suitable catalyst at any suitable conditions.

Addition of octanol (C8 alcohol) as opposed to fatty acid biological oils may not cause a reduced loss of desulfurization activity. According to one embodiment, bio-oil can be converted to a linear alcohol, such as before hydrotreating.

According to one embodiment, the invention relates to recovery of desulfurization activity of a cobalt molybdenum based hydrodesulfurization catalyst, when used in coprocessing mineral oil and bio-oil by periodically turning off and/or terminating a bio-oil feed. Operating strategies and/or techniques based on this phenomenon may be used and/or practiced to lengthen a lifetime of hydrodesulfurization catalyst used in bio-oil coprocessing applications and/or increase a hydrotreating unit capacity.

According to one embodiment, the invention can include a single stage hydrotreater with bio-oil co-feed. The bio-oils can be more reactive than mineral based gas-oil. Bio-oils can have a higher hydrogen consumption; and an increased gas yield, such as more methane, ethane, ethylene, propane, propylene, and/or the like. For example, replacement of about 5 weight percent of gas-oil with vegetable based oil (veg-oil) at the same total feed-rate can cause (a) a higher hydrogen make-up rate and increased purge rate to maintain a same recycle purity of a hydrogen recycle stream, and (b) an increased exotherm in the reactor, such as from the deoxygenation of the veg-oil.

According to one embodiment, a hydrotreating unit may include a preheater designed to minimize veg-oil degradation. The hydrotreating unit may include a high hydrogen consumption along with an associated exotherm when processing veg-oil versus when not processing veg-oil. The hydrotreating unit may include a temperature control device and/or scheme, such as a high pressure liquid quench, and/or the like. The hydrotreating unit can also include a gas circulation rate with relatively high flow rates (C1-C3 compounds, hydrogen, and/or the like) and the hydrotreating unit can handle more water, such as formed from processing the veg-oil. The hydrotreating unit can include catalyst to handle carbon oxides and may include carbon dioxide hydrogenation (such as to form methane and water) and/or carbon dioxide scrubbing. The hydrotreating unit may have reduced capital costs compared to another unit, such as effectively diluting the veg-oil to maintain the exotherm under control can allow lower alloy and/or milder steel vessel construction and/or fabrication.

According to one embodiment, the invention can include a single stage gas oil hydrotreating unit (main reactor) with a side-stream veg-oil hydrotreater (second reactor). The second reactor can be used in a same gas circuit as the main reactor, such as with the same compressors and high pressure separator. Both reactors can operate at nominally the same pressure and/or circulation (treat) gas composition. Catalyst used in the second reactor can be the same or different than catalyst used in the main reactor. Desirably, the catalyst for the second reactor can be somewhat sulfur tolerant. The second reactor can be any suitable size. A ratio of the main reactor volume to the second reactor volume can be between about 100:1 to about 1:100, between about 20:1 to about 1:20, about 1:1, and/or the like. Any suitable amount of the hydrotreating process effluent (product) can be based on co-feeding veg-oil, such as between about 0 weight percent and about 100 weight percent, between about 5 weight percent and about 25 weight percent, and/or the like of a total feed to a hydrotreating zone and/or unit.

The hydrotreating unit with the main reactor and the second reactor (in series configurations and/or parallel configurations) may minimize and/or reduce an impact of co-feed on the main reactor. The combined product of the reactors can reduce and/or simplify handling of high cloud-point veg-oil based product. The combined unit with two reactors can have reduced capital costs compared to separate units, such as by utilizing a common gas separator, a common gas compressor, other recycle equipment, and/or the like. The second reactor can be optimized for veg-oil treatment, such as by selecting appropriate catalysts, reactor temperatures, and/or the like. The second reactor may use a more acidic catalyst designed to perform isomerization and/or cracking, such as to improve cold-flow properties of the product, for example.

According to one embodiment, the invention can include a single stage gas oil hydrotreater (main reactor) with veg-oil hydrotreater (second reactor) in a hydrogen make-up circuit. A hydrogen make-up rate to the unit can provide enough flow of hydrogen (treat) gas for the main reactor and second reactor. In this configuration, the second reactor essentially can operate on once through hydrogen. An optional make-up supply can be connected to the main reactor. This configuration can allow the second reactor to be fully optimized in terms of catalyst choice and/or reaction conditions, such as temperature and/or pressure. This configuration can offer more options for veg-oil product upgrade because the veg-oil reactor does not contact a sulfur containing feedstock (parallel hydrotreaters). This configuration can allow hydrodesulfurization to occur without competition of the hydrodeoxygenation and associated inhibiting byproducts (carbon oxides and/or water). The second reactor may use a precious metal catalyst and may be easier to construct than side-stream reactor, such as by simplifying piping in the hydrogen recycle system.

Principle components of bio-oils can include triglycerides, pyrolysis oils, other suitable compounds, derivatives of other biologically based components, and/or the like. Triglycerides can be formed from three fatty acids (branches) attached to a glycerol backbone (3 carbon atoms). The fatty acids may have a carbon chain length of any suitable number, such as between about 12 and about 24 carbon atoms. The bio-oils can be fully saturated and/or have one or more unsaturated double bonds in the hydrocarbon chain and/or branch. Generally, bio-oils can be low in sulfur content, but may have oxygen and/or nitrogen heteroatoms.

Triglycerides can be upgraded to biodiesel products by using various processes which can include esterification, hydrogenation, decarboxylation, and/or the like.

Hydrogenation can consume a large amount of hydrogen with a portion forming the reaction product water. Increased hydrogen consumption can be expensive due to capital and/or operating costs of hydrogen supply. Decarboxylation can form methane as carbon dioxide hydrogenates. Hydrotreater operations can seek to minimize carbon dioxide formation, such as may reduce hydrogen consumption, reduce potential corrosion problems, reduce potential metallurgical issues, and/or the like. Carbon dioxide levels can be controlled with a purge stream. The purge stream can include hydrogen further increasing hydrogen consumption. The purge stream can be burned as fuel gas, flared, recovered in a hydrogen recovery unit (cryogenic, adsorption, absorption, membrane, and/or the like), sent to a sulfur recovery unit (Claus unit and/or the like), returned to a hydrogen plant front end for clean up (before and/or after a reformer, for example), and/or the like.

According to one embodiment, the invention can include a fixed bed hydrotreater with a co-feed of bio-oil with feed of mineral oil. The hydrotreater reactor system can operate at a relatively low hydrogen pressure, such as less than about 30 bars. The hydrotreater can operate at a high bio-oil content, such as greater than about 30 weight percent of fresh feed. The hydrotreater can use a cobalt and molybdenum catalyst on an alumina support. The hydrotreater can include a carbon dioxide scrubbing device in a recycle gas system. The carbon dioxide scrubber can include an amine and/or a promoted amine, such as monoethanolamine, diethanolamine, and/or the like. The carbon dioxide scrubber can include a membrane to separate carbon dioxide from hydrogen, such as a polymeric membrane, a ceramic membrane, a metal film membrane, and/or the like. The carbon dioxide scrubber can include a solid adsorbent, such as a zeolite, a molecular sieve, an activated carbon, an amorphous silica-aluminate, and/or the like. The carbon dioxide scrubber can include a basic oxide formed from an alkali metal (Li, Na, K, Cs, and/or the like), an alkaline earth metal (Mg, Ca, Sr, Ba, and/or the like), a rare-earth metal (La, Ce, and/or the like), and/or the like. The adsorbent could be regenerated thermally at a suitable temperature and/or with a suitable medium and/or carrier gas. The carbon dioxide may be suitable for industrial applications, food applications, beverage applications, medical applications, liquefaction, solidification, sequestration, and/or the like.

According to one embodiment, the invention can include a hydrotreater with an interbed purge. A multiple bed reactor can include interbed removal of process gas, such as hydrogen, carbon dioxide (inhibiting byproduct), other light gases, and/or the like. The reactor can include injection of fresh hydrogen (make-up and/or recycle following a carbon oxide removal system) to each bed. Any suitable amount of flow through the bed can be used for the interbed purge, such as between about 0 volume percent to about 100 volume percent, between about 5 volume percent and about 50 volume percent, between about 10 volume percent and about 30 volume percent, and/or the like.

According to one embodiment, the invention can include a fluidized bed hydrotreater, an ebullated bed hydrotreater, and/or the like. The catalyst may include any suitable particle size. A portion of the catalyst can be withdrawn from the reactor on a continuous basis and/or an intermittent basis (batch) to be regenerated. Catalyst regeneration can occur in a main reaction zone, a separate zone, a separate vessel, and/or the like. Regeneration can be done with hydrogen, water, steam, oxygen, and/or the like.

Some potential benefits of the hydrotreater units of the invention can include reduced hydrogen consumption, production of concentrated carbon dioxide streams, improved environmental performance by lower greenhouse gas emissions, and/or the like. According to one embodiment, the invention includes adding a carbon dioxide removal step and/or system in combination with low operating pressures. The carbon dioxide removal system may also remove hydrogen sulfide, nitrogen oxides, and/or the like from the recycle gas.

According to one embodiment, the invention can include a process for the production of hydrocarbons. The process can include the step of (a) feeding hydrogen and a first feedstock including one or more hydrocarbons to a first reactor to produce a first hydrogenated product stream including hydrocarbons present in or derived from the first feedstock, and the step of (b) feeding hydrogen and a second feedstock (bio-oil), such as including a carboxylic acid, a phenol, a ketone, an alcohol, derivatives thereof, and/or the like, to a second reactor to produce a second hydrogenated product stream including hydrocarbons derived from the bio-oil. The process can also include the step of (c) feeding the first hydrogenated product stream and second hydrogenated product stream to a separator, and the step of (d) removing from the separator a liquid hydrocarbon phase including hydrocarbons from the first hydrogenated product stream and from the second hydrogenated product stream, and a vapor phase including unreacted hydrogen and volatile components present in the first and second feedstocks, and produced in the hydrogenation reactions in the first and second reactors.

This configuration can include and/or produce two separate hydrogenation reactions, hydrogenation of a first hydrocarbon-containing feedstock takes place in a first reactor, and hydrogenation of a second feedstock including a bio-oil takes place in a second reactor. Two reactors can be operated concurrently, although separate batch processing may be used. A product stream from the first reactor (the first hydrogenated product stream) can include hydrocarbons that are present in and/or derived from the hydrocarbon-containing oil (mineral). A product stream from the second reactor (the second hydrogenated product stream) can include hydrocarbons produced from the reaction between hydrogen and the bio-oil.

The process can be used in the production of liquid hydrocarbon fuels, for example gasoline, diesel, aviation gasoline, jet fuel, kerosene, fuel oil, bunker oil, and/or the like. Light hydrocarbons can also be produced by the process, for example one or more C1 to C4 hydrocarbons which may be paraffinic in nature. The light hydrocarbons can be used in the production of gaseous hydrocarbon fuels, LPG (liquefied petroleum gas), and/or the like. According to one embodiment, the hydrocarbon fuels can be used directly and/or for blend stocks in products meeting and/or complying with industry standards and/or regulations.

According to one embodiment and in the first reactor, a first feedstock including one or more hydrocarbons contacts with hydrogen to produce a first hydrogenated product stream. The hydrocarbons in the first hydrocarbon-containing feedstock may be predominantly paraffinic hydrocarbons, but can also include other hydrocarbons. Other hydrocarbons may include unsaturated hydrocarbons, olefins, aromatics, heteroatom containing organic compounds, organonitrogen compounds, organosulfur compounds, and/or the like.

The first feedstock may be derived from gas, coal, biomass, other suitable raw materials, and/or the like. The raw materials may be converted to syngas (synthesis gas) through processes, such as steam reforming, partial oxidation, gasification, and/or the like. The syngas can be subsequently converted to hydrocarbons through Fischer-Tropsch synthesis, other suitable gas to liquids processes, and/or the like.

According to one embodiment, the one or more hydrocarbons in the first feedstock can be derived from crude oil. Crude-oil derived hydrocarbon compositions can be higher in heteroatom-containing organic compounds compared to Fischer Tropsch-derived oils. The first feedstock can include hydrocarbons derived from one or more process streams associated with crude oil refining, for example straight-run fractions, naphtha, kerosene, light gas oil, heavy gas oil, vacuum gas oil, light cycle oil, heavy cycle oil, coker naphtha, visbroken naphtha, coker gas oil, visbroken gas oil, and/or the like. Additionally and/or alternatively, it may be derived from or include hydrocarbons produced by one or more other refinery processes, such as cracking, catalytic cracking, hydrocracking, reforming, coking, dearomatization, isomerization, alkylation, and/or the like.

Sulfur compounds may include carbonyl sulfide, hydrogen sulfide, mercaptans, sulfides, disulfides, cyclic thioethers, polycyclic thioethers, aromatic thioethers, thiophenes, benzothiophenes, dibenzothiophenes, alkyl-substituted sulfur derivatives, and/or the like. Sulfur compounds can be present in total at concentrations greater than those allowed in the desired fuel by state and/or governmental regulatory authorities. Sulfur content of the hydrocarbon-containing oil can be any suitable value, such as about 0 parts per million or more, about 200 parts per million or more, about 0.1 weight percent or more, between about 0.2 weight percent to about 2 weight percent, and/or the like, expressed as elemental sulfur. Olefins, content of the hydrocarbon-containing oil can be about 0 weight percent, greater than about 0.01 weight percent, up to about 50 weight percent, up to about 20 weight percent, and/or the like. Other possible constituents of the first hydrocarbon-containing oil may include aromatic compounds, polyaromatic compounds, naphthenes, and/or the like.

Nitrogen-containing organic compounds may include ammonia, amines, anilines, cyclic amines, aromatic amines, pyrrole, pyridine, indole, isoindole, quinoline, carbazole, acridine, alkyl nitrogen substituted derivatives, and/or the like. The nitrogen-containing organic compounds may have any suitable concentration, such as about 0 parts per million, between about 0.1 parts per million to about 3,000 parts per million, and/or the like, expressed as elemental nitrogen.

In one embodiment, the one or more hydrocarbons in the first feedstock boil at temperatures between about 150 degrees Celsius to about 400 degrees Celsius. Molecules of the first feedstock may include any suitable number of carbon atoms, such as between about 10 to about 22. The molecules can be used in production of diesel fuel, heating oil, jet fuel, other distillate material, and/or the like.

Conditions in the first reactor can be maintained to reduce a concentration of non-paraffinic species contained in the first feedstock, for example to hydrogenate olefins to paraffins, convert organic nitrogen compounds to ammonia, convert organic sulfur compounds to hydrogen sulfide, form other suitable volatile compounds, and/or the like. This can be achieved by employing conditions used in refinery hydrocracking processes, hydrodenitrification processes, hydrodesulfurisation processes, and/or the like.

Aromatic compounds may additionally be present in the hydrocarbon-containing oil, such as benzenes, xylenes, toluenes, other polyaromatic compounds, naphthalenes, phenanthrenes, and/or the like.

Suitable reactor conditions for hydrodesulfurization, hydrodenitrification, hydrocracking, and/or the like can include temperatures between about 250 degrees Celsius to about 430 degrees Celsius, and pressures between about 20 bars to about 200 bars on an absolute pressure basis. A severity of the reactor conditions can depend on the nature of the hydrocarbon-containing process stream being fed to the reactor, the nature of the desired hydrocarbon product stream, and/or the like.

For example, when removing heteroatom-containing organic compounds from a stream suitable for gasoline fuel, low severity hydrogenation conditions with temperatures between about 250 degrees Celsius to about 350 degrees Celsius and pressures between about 20 bars absolute to about 40 bars absolute can be used. When removing heteroatom-containing organic compounds and olefins from a hydrocarbon-containing oil suitable for diesel fuel, then moderate severity hydrotreating conditions may be employed with temperatures between about 300 degrees Celsius to about 400 degrees Celsius and pressures between about 30 bars absolute to about 70 bars absolute. For vacuum gas oil feedstocks and other relatively high boiling hydrocarbon-containing oils, more severe hydrotreating conditions may be employed, such as temperatures between about 350 degrees Celsius, to about 410 degrees Celsius and pressures between about 70 bars absolute to about 150 bars absolute. When cracking feedstocks to produce a mixture of hydrocarbons suitable for gasoline and/or diesel fuels, higher severity, hydrocracking conditions can be employed, such as temperatures between 350 degrees Celsius to about 430 degrees Celsius and pressures in the between about 100 bars absolute to about 200 bars absolute.

The hydrogenation reaction in the first reactor may be catalyzed or uncatalyzed. Suitable catalysts may include nickel, cobalt, molybdenum, platinum, palladium, ruthenium, rhodium, and/or the like. Optionally, catalysts can be supported on a support, such as silica, alumina, gamma-alumina, silica-alumina, Mania, zirconia, carbon, activated carbon, zeolites and/or the like. Where the first feedstock includes sulfur-containing compounds, the catalysts can be preferably selected from nickel, cobalt, and/or molybdenum. Sulfur may deactivate some metals, such as platinum, palladium, ruthenium, rhodium, and/or the like.

In the first reactor and according to one embodiment, the first feedstock can be contacted with hydrogen to produce a first hydrogenated product stream. Where the first feedstock includes olefins, organosulfur compounds, organonitrogen compounds, and/or aromatic compounds, the first hydrogenated product stream generally can include such components at lower concentrations than the first feedstock. For example, olefins can be converted to corresponding paraffinic hydrocarbons, heteroatom-containing organic compounds can be converted to hydrocarbons and volatile heteroatom-containing compounds, aromatic compounds can be converted into compounds with less aromatic character, cyclic alkanes, naphthenes, cyclic compounds with isolated double bonds, compounds with nonconjugated aromatic double bonds, and/or the like. Unreacted hydrogen can also form part of the first hydrogenated product stream.

In the second reactor and according to one embodiment, the second feedstock can include a bio-oil. The feedstock can be contacted with hydrogen to produce a second hydrogenated product stream including hydrocarbons derived from the bio-oil. Additional components and/or compounds may result from the hydrogenation reaction, such as light hydrocarbons (for example, C1 to C4 alkanes), one or more oxides of carbon (for example, carbon monoxide (CO) and carbon dioxide ($CO_2$)), water, and/or the like. Unreacted hydrogen can be present in the second hydrogenated product stream.

The second feedstock can include a bio-oil, such as a carboxylic acid and/or a carboxylic acid derivative. A derivative of a carboxylic acid can be a compound that would yield the carboxylic acid when subjected to a hydrolysis reaction, for example. Examples of derivatives of carboxylic acids may include carboxylic acid esters and carboxylic acid anhydrides.

The second feedstock can include bio-oils and/or the like. The bio-oils may have a suitable boiling range, such as the boiling range of the hydrocarbons produced by a hydrogenation reaction in a same range as those in the target hydrocarbon fuel. The carbon chain lengths can also be similar to hydrocarbons suitable for use in the target fuel. For example, diesel fuels may include hydrocarbons with about 10 carbon atoms to about 22 carbon atoms. Bio-oils used to produce hydrocarbons with numbers of carbon atoms in this range can be any suitable compound, such as mono-carboxylic acids, di-carboxylic acids, n-hexadecanoic acid, 1,16-di-hexadecanoic acid, and/or the like.

Fatty acids, fatty acid derivatives, and/or the like can also be suitable for feedstocks. For example fatty acids with a general formula of $R^1C(O)OH$ and/or esters with a general formula of $R^1C(O)O—R^2$ can be fed to the reactor. $R^1$ and $R^2$ can be selected from hydrocarbon chains, substituted hydrocarbon chains, and/or the like. Examples of fatty acids and/or fatty acid derivatives useful in the production of hydrocarbon diesel fuel may include lauric acid, myristic acid, palmitic acid, stearic acid, linoleic acid, oleic acid, arachidic acid, erucic acid, and/or the like. Other suitable derivatives may include compounds where $R^1$ includes 11, 13, 15, 17, 17, 19 and/or 21 carbon atoms respectively. In one embodiment, the feedstock may include esters, such as in the form of monoglycerides, diglycerides, triglycerides, and/or the like. The esters may have a general formula of $[R^1C(O)O]_nC_3H_5(OH)_3—$, where n can be 1, 2, 3, and/or the like. The fatty acids and/or fatty acid derivatives may have saturated hydrocarbon groups, and/or unsaturated hydrocarbon groups. Diglycerides and/or triglycerides may include hydrocarbon chains derived from the same and/or different fatty acids.

The bio-oils can be derived from biomass, such as fats and/or oils derived from plants, animals, algae, other microbial organisms, and/or the like. Full combustion use of biologically-derived bio-oils can have a lower net emission of atmospheric carbon dioxide compared to an equivalent fuel derived purely from mineral sources. Suitable biological sources of bio-oils may include plant-derived oils, such as rapeseed oil, peanut oil, canola oil, sunflower oil, tall oil (pine oil), corn oil, soybean oil, and/or the like. Other suitable materials may include animal oils and/or fats, such as tallow, lard, poultry fats, fish oils and fish fats, blubber, substances from other marine organisms, substances from land animals, substances from other airborne animals, and/or the like. Another suitable source may include waste oils, such as used cooking oils and/or the like.

Biological oils and/or fats generally may include triglycerides with fatty hydrocarbon chains having numbers of carbon atoms commensurate with hydrocarbons found in diesel fuel. According to one embodiment, the second reactor maintains conditions which enable the bio-oil to undergo decarboxylation and/or hydrodeoxygenation reactions to produce hydrocarbons in a diesel fuel boiling range. The conditions within the second reactor can be maintained to reduce cracking reactions of the fatty acid hydrocarbon groups, such as to reduce production of shorter-chain hydrocarbons with generally lower boiling point (less suitable for diesel fuel). Minimizing hydrocarbon cracking can also help reduce hydrogen consumption and improve energy utilization and/or feedstock efficiency.

To obtain a hydrocarbon from a bio-oil, two reaction pathways can be followed as shown below in equations I and II with a fatty acid triglyceride. In equation I, oxygen from the carboxylate group of the triglyceride can be removed in the form of carbon dioxide. As a result, the product hydrocarbon, $R^1H$ may not include a carboxyl carbon. The reaction of equation I can be referred to as decarboxylation.

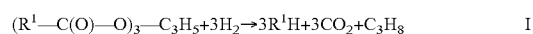
$$(R^1—C(O)—O)_3—C_3H_5+3H_2 \rightarrow 3R^1H+3CO_2+C_3H_8 \qquad I$$

In equation II, oxygen can be removed as water, and the product hydrocarbon $R^1CH_3$ may include a carboxyl carbon. The reaction of equation II can be referred to as hydrodeoxygenation.

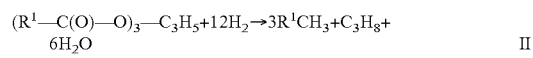
$$(R^1—C(O)—O)_3—C_3H_5+12H_2 \rightarrow 3R^1CH_3+C_3H_8+6H_2O \qquad II$$

Other reactions that may occur in the reactor include reduction of carbon dioxide to carbon monoxide and methane, according to reactions III and IV.

$$CO_2+H_2 \rightarrow CO+H_2O \qquad III$$

$$CO+3H_2 CH_4+H_2O \qquad IV$$

A mixture and/or a combination of the reactions III and IV can take place in the second reactor.

In the production of lower boiling point fuels (such as gasoline with a boiling point range of between about 20 degrees Celsius and about 220 degrees Celsius) cracking of the hydrocarbons can be advantageous. For example, hydrocarbon chains in fatty acids and/or fatty acid derivatives may be longer than hydrocarbons present in gasoline. By using cracking processes, the long fatty acid-derived hydrocarbon chains can be converted into shorter carbon chain hydrocarbons, such as with a lower boiling point and can be more suitable for use as or in the production of gasoline.

According to one embodiment, a mixture of both mineral oil and biological oil can be supplied to the second reactor, such as to dilute and/or temper an exotherm. Optionally, additional hydrocarbons (such as a portion of the first feedstock and/or a portion of the first hydrogenation product stream and/or a portion of the liquid phase from the separator) can be fed to the second reactor in addition to the second feedstock. Hydrogenation of bio-oils can be highly exothermic, so diluting their concentration with less reactive hydrocarbons can mitigate temperature rises in and/or across the second reactor. Another way of mitigating excessive temperature rises can be to pre-saturate the second feedstock with hydrogen in a pre-saturator, such as to feed and/or supply a liquid phase including dissolved hydrogen to the second reactor. Pre-saturation of hydrogen can also be used for the first feedstock before feeding it to the first reactor.

Conditions in the second reactor can be maintained such that the one or more bio-oils can be converted into one or more hydrocarbons. Hydrogen consumption by the bio-oil may be greater than that of the hydrocarbon-containing first feedstock. Temperatures between about 200 degrees Celsius to about 410 degrees Celsius, between about 320 degrees Celsius to about 410 degrees Celsius, and/or the like can be maintained in the second reactor. Pressures between about 1 bar absolute to about 200 bars absolute, between about 10 bars absolute to about 150 bars absolute, and/or the like can be maintained in the second reactor.

Conditions can be maintained in the second reactor such that almost complete conversion of the bio-oil can be achieved, such as greater than about 90 weight percent conversion, greater than about 95 weight percent, and/or the like. The reaction in the second reactor can be catalyzed, such as by a suitable catalyst discussed above.

The first hydrogenated product stream and second hydrogenated product stream can be fed to a separator, in which volatile products can be removed as a vapor phase and liquid hydrocarbons can be separated as a liquid phase. The liquid phase hydrocarbons can be used as and/or in the production of a liquid hydrocarbon fuel. Optionally and/or alternatively, the liquid phase hydrocarbons can be further separated into two or more different fractions, such as based on boiling point. Each fraction can be used as and/or in the production of separate liquid hydrocarbon fuels. The liquid phase hydrocarbons may be processed by one or more additional steps.

Separation of vapor and liquid phase components can be achieved using distillation, such as with a distillation tower, a fractionation column, and/or the like. The vapor phase components can be removed from the top of the column, while one or more liquid phase hydrocarbon fractions can be removed from different levels within the column. Optionally and/or alternatively, flash separation vessels and/or drums can be used instead of and/or in addition to distillation columns (multiple theoretical stages). The flash drums can be used where a proportion of volatile components to liquid components may be high and/or where no separation of the liquid phase hydrocarbons into two or more fractions may be desired. Flash separation can be carried out before product distillation.

The vapor phase removed from the separator can be recycled to the first reactor and/or the second reactor. A purge stream can be removed from the vapor phase before recycle to prevent a build up of contaminants, such as hydrogen sulfide, carbon monoxide, carbon dioxide, ammonia, methane, ethane, propane, other nitrogen compounds, other sulfur compounds, and/or the like. The contaminants may affect reactions rates, act as catalyst poisons, and/or form relatively inert components (diluents) that can act as a diluent.

According to one embodiment, hydrogen in the vapor phase from the separator can be recycled only to the first reactor, such as to prevent impurities like sulfur-containing compounds present in the vapor fraction from the separator from contacting the catalyst in the second reactor. This configuration enables catalysts that may be prone to deactivation in the presence of impurities (sulfur) to be used therein. Suitable catalysts may include platinum, palladium, ruthenium, rhodium, and/or the like.

The liquid phase from the separator can be low in sulfur content and/or nitrogen content. The sulfur content may be below about 500 parts per million, below about 50 parts per million, and/or the like, expressed as elemental sulfur.

The separator may, but not necessarily, operate at a pressure less than that of the first reactor and/or the second reactor. According to one embodiment, use of a common separator for treating the first and second hydrogenated process streams can be advantageous, because a separate treatment unit for converting feedstocks including bio-oils can be retrofitted to existing fuel production units (refineries). This configuration can also use existing infrastructure for treatments and/or processes, such as purification and/or separation. This configuration can provide improved energy integration and also enable existing compressors to be used, for example in hydrogen recycle.

Another advantage of this configuration can be the production of diesel fuel including components derived from biological sources. Hydrocarbons produced from the biological oil may tend to be linear paraffins, which can have poor cold flow characteristics. Paraffins can be isomerised and used as a diesel fuel. By mixing the biological hydrocarbons with existing conventionally derived diesel components, the impact of the biologically-derived linear paraffins can be minimized. Diesel components may be derived from catalytic crackers, visbreakers, cokers, and/or the like. These diesel components can include branched alkanes and aromatic components with good cold flow characteristics.

Optionally and/or alternatively, isomerization reactions can be carried out on any one or more of the first and/or second hydrogenated product streams, the liquid phase removed from the separator, any liquid hydrocarbon fuels, other suitable fractions, and/or the like. Isomerization may be conducted in the presence of hydrogen and in the presence of a catalyst. Isomerized hydrocarbons can be produced in the second reactor by suitable selection of catalyst and process conditions.

According to one embodiment, operating hydrogenation reactions in separate reactors can allow different conditions for hydrogenating each of the feedstocks, such as to optimize reaction conditions, improve product yields, and/or the like. The second reactor, may have a lower volume of feedstock to hydrogenate, so the second reactor can be smaller than the first reactor. For example, where a liquid hydrocarbon fuel has 5 weight percent and/or volume of its hydrocarbons derived from a biological oil, then the second reactor used to hydrogenate the biological oil can be about 5 percent of a size of the first reactor. The smaller reactor can be less expensive to construct and energy intensive to operate than a larger reactor.

The liquid phase removed from the separator and/or the liquid hydrocarbon fractions separated in the separator, may include between about 0.1 weight percent to about 49.9 weight percent, between about 2 weight percent to about 15 weight percent, and/or the like of hydrocarbons derived from the second hydrogenated product stream. Hydrocarbons derived from the first hydrogenated product stream can form a majority in the liquid phase hydrocarbons removed from the separator and/or in the final liquid fuel hydrocarbons.

FIG. 1 schematically shows a hydrotreating unit 10, according to one embodiment. The hydrotreating unit 10 receives a mineral oil based hydrocarbon stream 14 and a biological oil based hydrocarbon stream 16. The mineral oil based hydrocarbon stream 14 connects and/or passes to a first reactor 20 to form a first hydrotreated product stream 26. The biological oil based hydrocarbon stream 16 connects and/or passes to a second reactor 22 to form a second hydrotreated product stream 28. The hydrotreating unit 10 includes a hydrogen recycle system 30 to form and/or separate a product stream 24, a recycle hydrogen stream 36, and a purge stream 40 withdrawn from the combined first hydrotreated product stream 26 and the second hydrotreated product steam 28. The hydrogen recycle system 30 can include a suitable gas separation apparatus and a compressor, for example. Optionally, the recycle hydrogen stream 36 can connect and/or pass to a carbon dioxide removal system 42 and form and/or separate a carbon dioxide steam 44. Hydrogen streams 32 to the first reactor 20 and the second reactor 22 come from a common hydrogen stream 38 connected to both a make-up hydrogen stream 34 and the recycle hydrogen stream 36.

Figure 2:
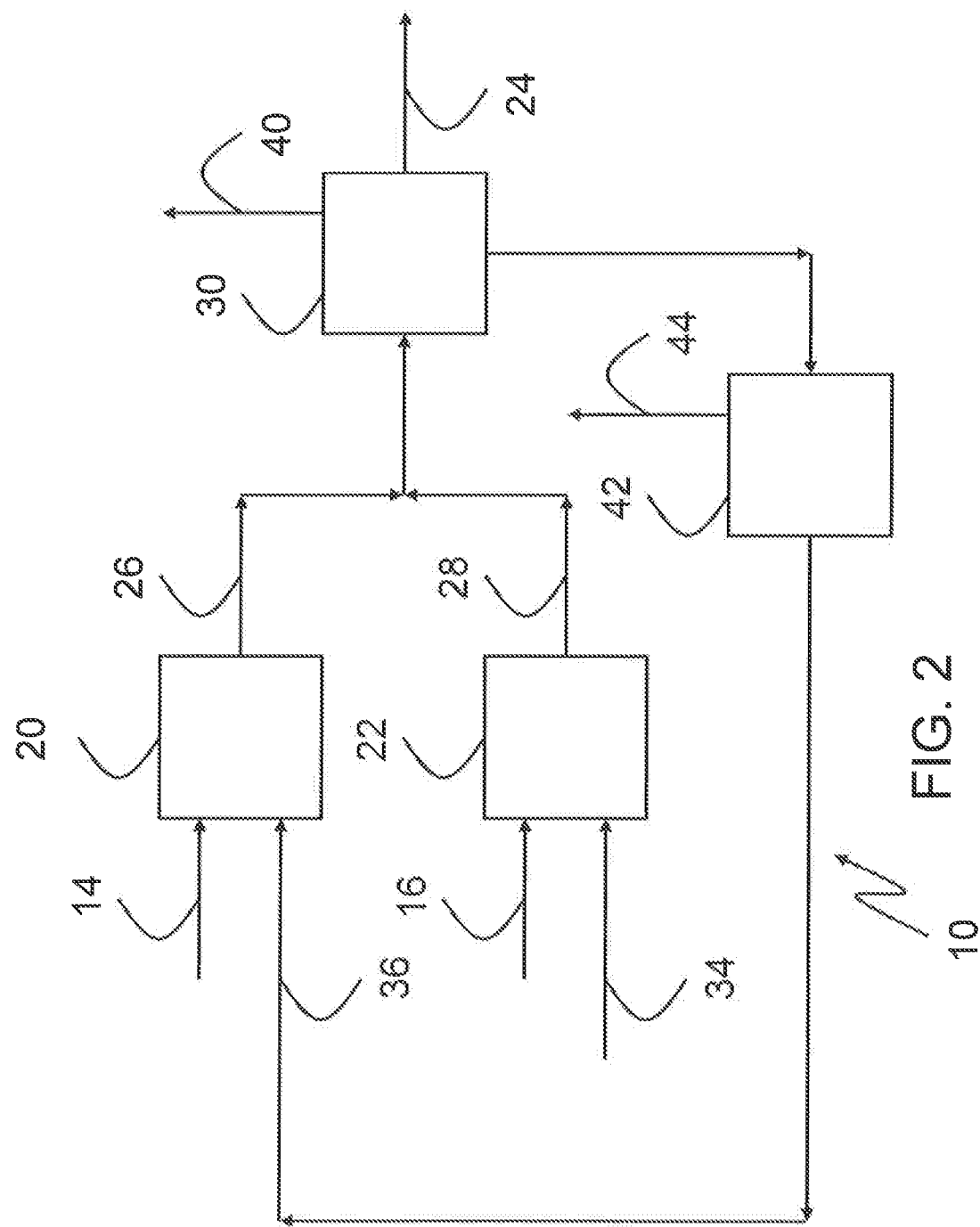
FIG. 2 schematically shows a hydrotreating unit, according to one embodiment.

FIG. 2 schematically shows a hydrotreating unit 10, according to one embodiment. The hydrotreating unit 10 receives a mineral oil based hydrocarbon stream 14 and a biological oil based hydrocarbon stream 16. The mineral oil based hydrocarbon stream 14 connects and/or passes to a first reactor 20 to form a first hydrotreated product stream 26. The biological oil based hydrocarbon stream 16 connects and/or passes to a second reactor 22 to form a second hydrotreated product stream 28. The hydrotreating unit 10 includes a hydrogen recycle system 30 to form and/or separate a product stream 24, a recycle hydrogen stream 36, and a purge stream 40 withdrawn from the combined first hydrotreated product stream 26 and the second hydrotreated product steam 28. Optionally, the recycle hydrogen stream 36 can connect and/or pass to a carbon dioxide removal system 42 and form and/or separate a carbon dioxide steam 44. The recycle hydrogen stream 36 connects and/or passes to the first reactor 20. A make-up hydrogen stream 34 connects and/or passes to the second reactor 22.

Figure 3:
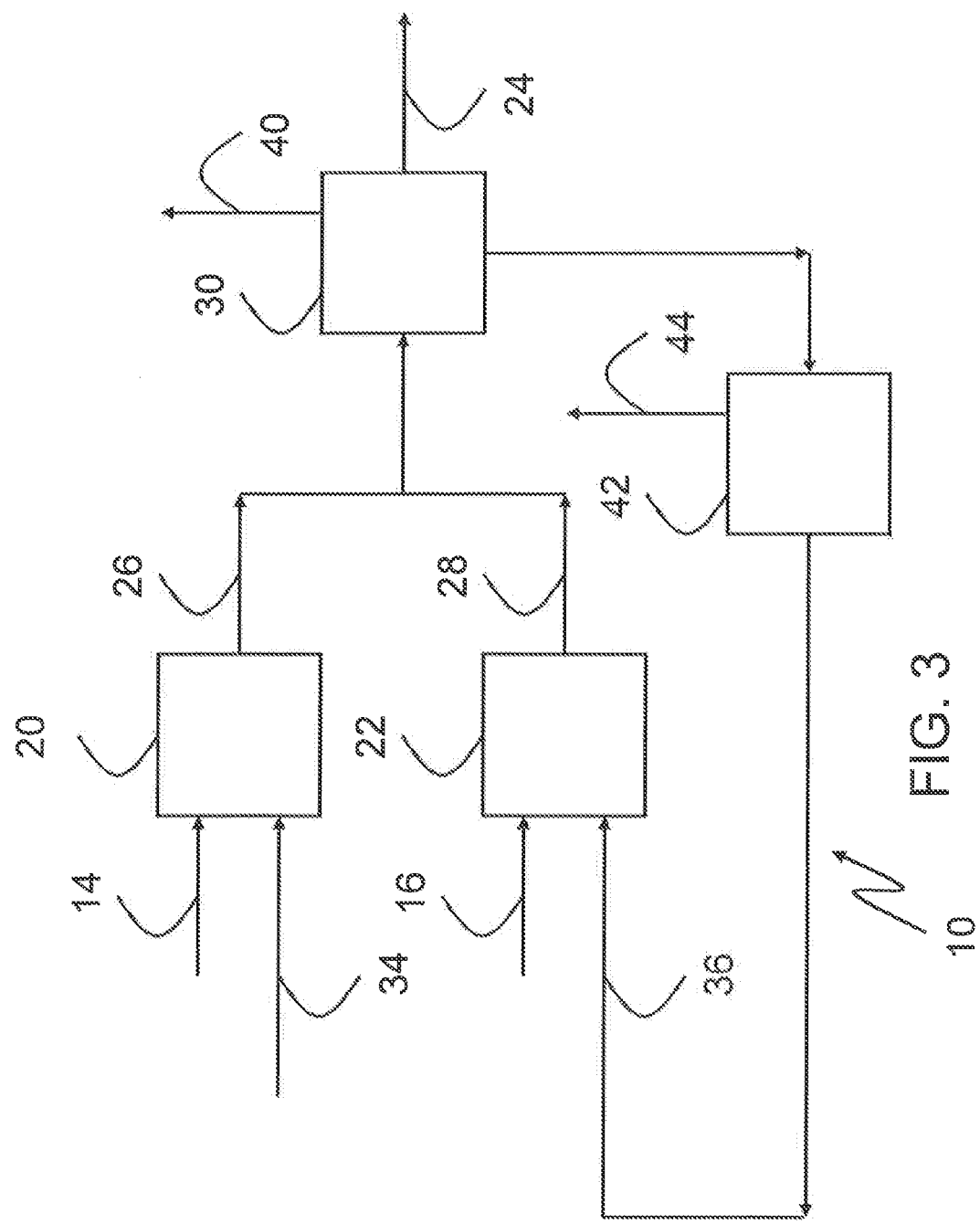
FIG. 3 schematically shows a hydrotreating unit, according to one embodiment.

FIG. 3 schematically shows a hydrotreating unit 10, according to one embodiment. The hydrotreating unit 10 receives a mineral oil based hydrocarbon stream 14 and a biological oil based hydrocarbon stream 16. The mineral oil based hydrocarbon stream 14 connects and/or passes to a first reactor 20 to form a first hydrotreated product stream 26. The biological oil based hydrocarbon stream 16 connects and/or passes to a second reactor 22 to form a second hydrotreated product stream 28. The hydrotreating unit 10 includes a hydrogen recycle system 30 to form and/or separate a product stream 24, a recycle hydrogen stream 36, and a purge stream 40 withdrawn from the combined first hydrotreated product stream 26 and the second hydrotreated product steam 28. Optionally, the recycle hydrogen stream 36 can connect to a carbon dioxide removal system 42 and form and/or separate a carbon dioxide steam 44. The recycle hydrogen stream 36 connects and/or passes to the second reactor 22. A make-up hydrogen stream 34 connects and/or passes to the first reactor 20.

Figure 4:
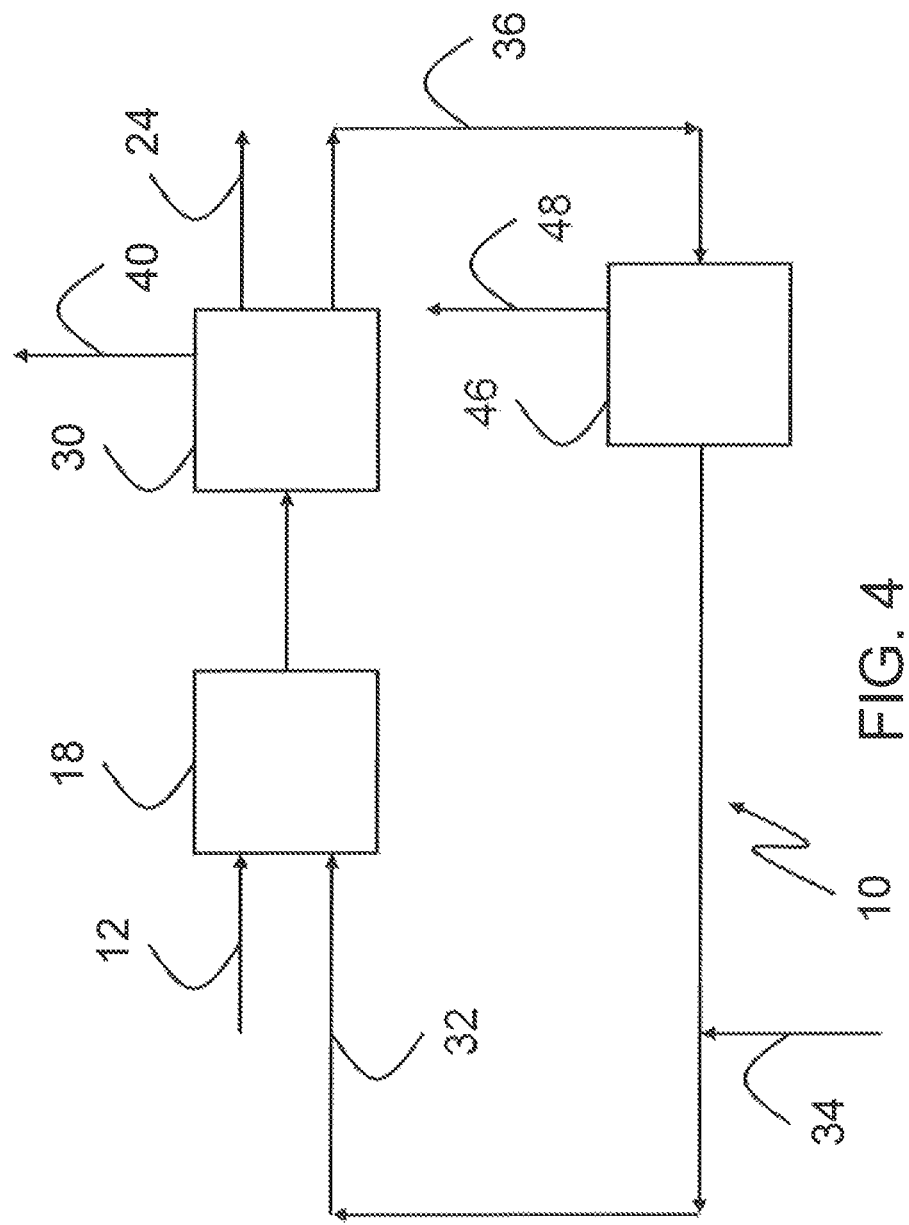
FIG. 4 schematically shows a hydrotreating unit, according to one embodiment.

FIG. 4 schematically shows a hydrotreating unit 10, according to one embodiment. The hydrotreating unit 10 includes a feed stream 12 connected to a hydrotreating reactor 18 to form a reactor effluent. The feed stream 12 includes both a mineral oil based hydrocarbon stream and a biological oil based hydrocarbon stream. The hydrotreating unit 10 includes a hydrogen recycle system 30 to form and/or separate a product stream 24, a recycle hydrogen stream 36 and a purge stream 40 withdrawn from the reactor effluent. A hydrogen stream 32 includes both a make-up hydrogen stream 34 and the recycle hydrogen stream 36. Optionally, the recycle hydrogen stream 36 can connect and/or pass to a carbon oxide removal system 46 and form and/or separate a carbon oxide steam 48.

Figure 5:
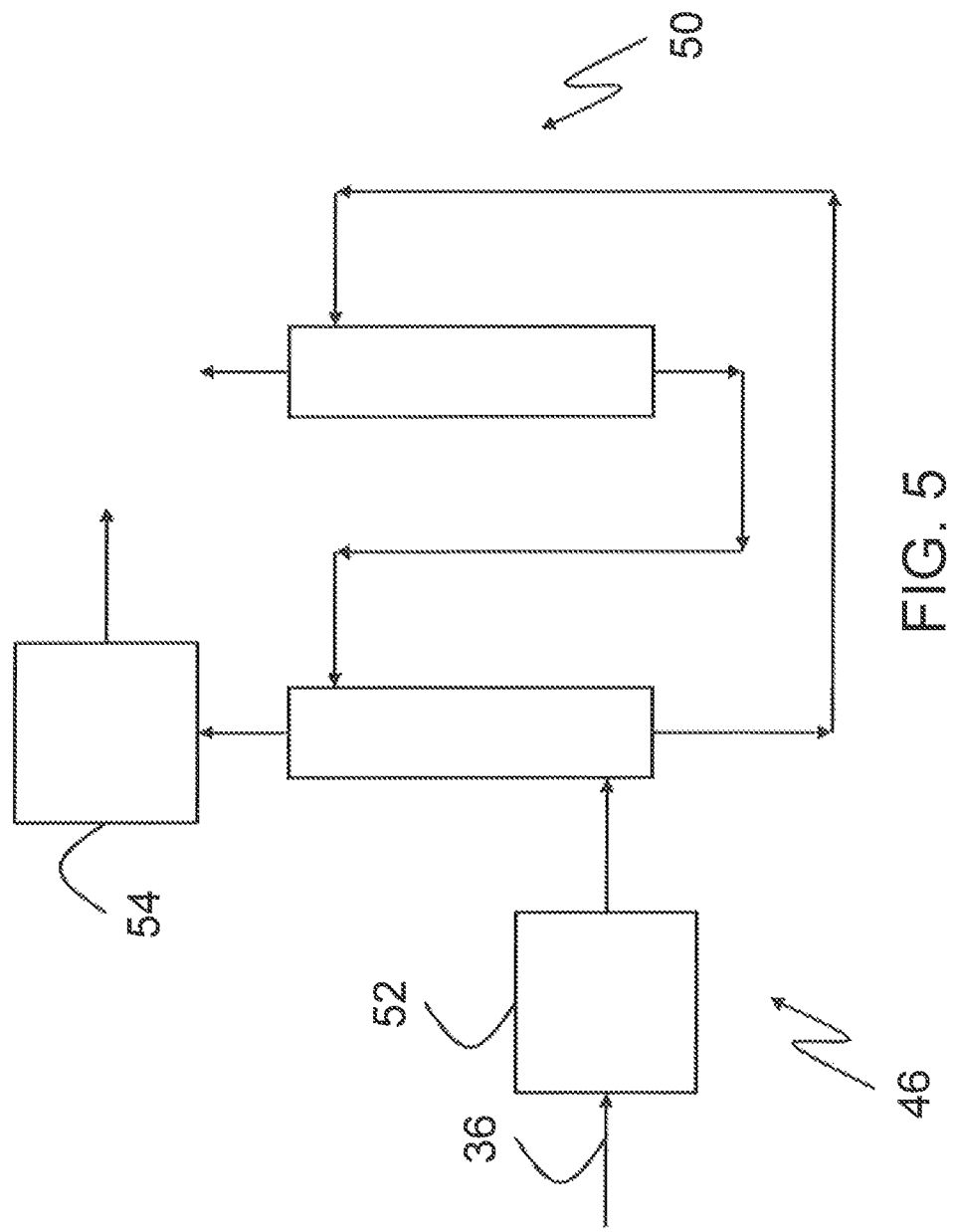
FIG. 5 schematically shows a carbon oxide removal system, according to one embodiment.

FIG. 5 schematically shows a carbon oxide removal system 46, according to one embodiment. The carbon oxide removal system 46 connects and/or passes a recycle hydrogen stream 36 to a water-gas shift reactor 52 (for converting carbon monoxide to carbon dioxide) followed by an absorption system 50 (for removing carbon dioxide), and optionally followed by a methanation reactor 54 (for removing and/or reducing remaining carbon oxides). The absorption system 50 may include an absorber column and/or tower and a stripper column and/or tower with a single flow of solvent and/or solution. A carbon dioxide vent and/or purge stream can leave and/or flow from a top of the stripper tower. Configurations of the absorption system 50 with multiple flows (such as lean flows and semi-lean flows, not shown) are within the scope of this invention. The methanation reactor 54 includes a cleaned up recycle hydrogen stream and/or line. In the alternative, the carbon oxide removal system 46 may exclude a water-gas shift reactor 52 and/or an absorption system 50, and include a methanation reactor 54.

Figure 6:
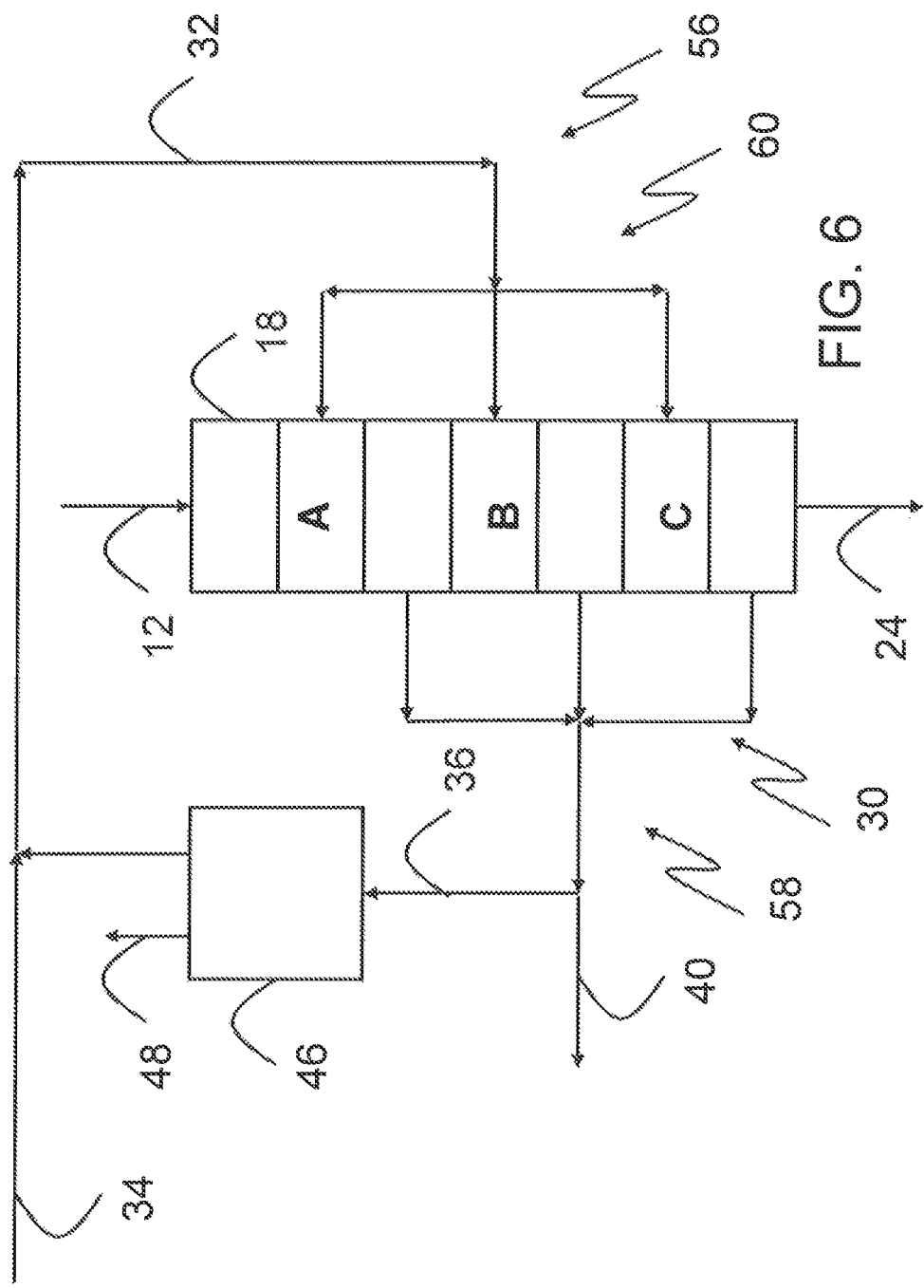
FIG. 6 schematically shows a hydrotreating reactor, according to one embodiment.

FIG. 6 schematically shows a hydrotreating reactor 18, according to one embodiment. The hydrotreating reactor 18 with connects and/or passes a feed stream 12 to form a product stream 24. The hydrotreating reactor 18 includes a multiple bed reactor 56 with individual beds A, B, and C, for example. Preferably the individual beds have a generally series configuration. Parallel configurations and/or series-parallel combinations are within the scope of this invention. The multiple bed reactor 58 can use a single pressure shell as shown and/or include more than one pressure shells and/or vessels. The hydrotreating reactor 18 includes interbed (between) purges 58 and optionally bed hydrogen supplies 60. The interbed purges 58 connect to and/or constitute a part of a hydrogen recycle system 30 to form and/or separate a recycle hydrogen stream 36 and a purge stream 40. A hydrogen stream 32 includes both a make-up hydrogen stream 34 and the recycle hydrogen stream 36. Optionally, the recycle hydrogen stream 36 can connect and/or pass to a carbon oxide removal system 46 and form and/or separate a carbon oxide steam 48.

Figure 7:
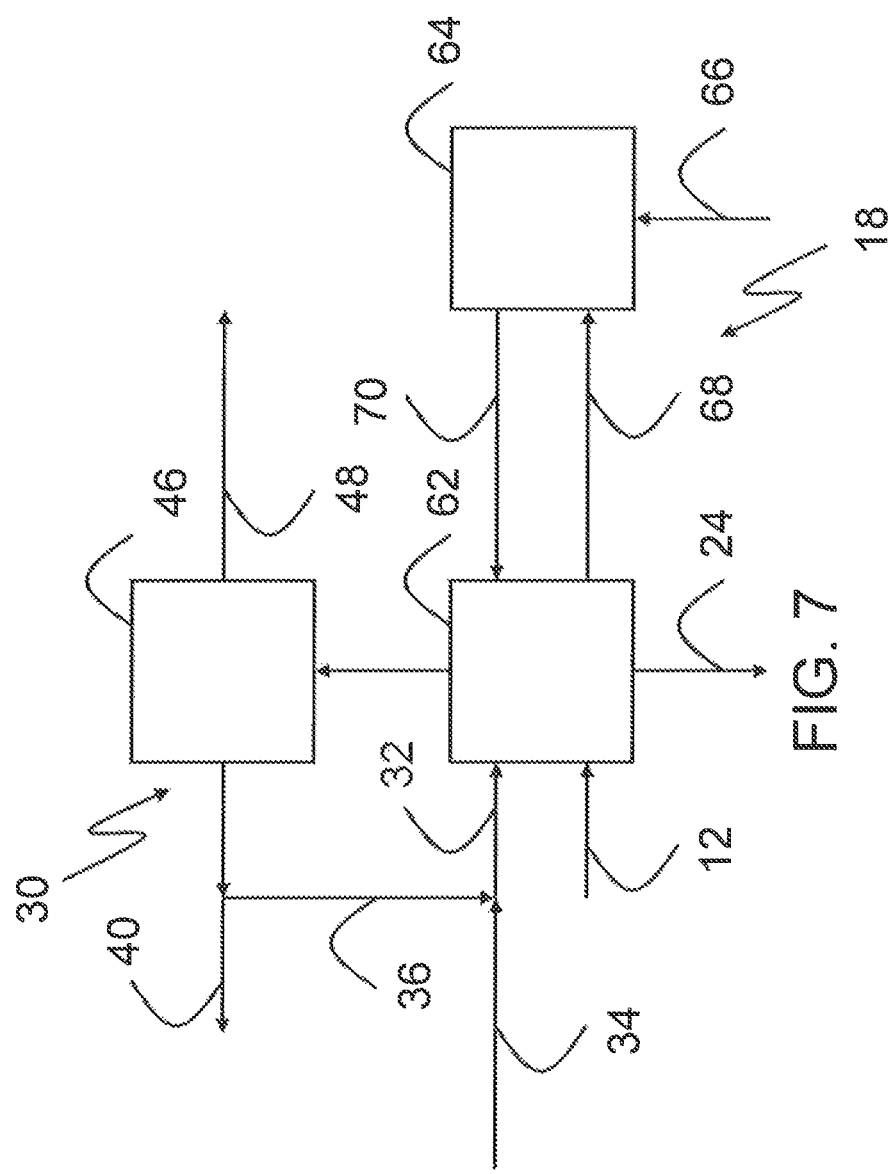
FIG. 7 schematically shows a hydrotreating reactor, according to one embodiment.

FIG. 7 schematically shows a hydrotreating reactor 18, according to one embodiment. The hydrotreating reactor 18 with connects and/or passes a feed stream 12 to form a product stream 24. The hydrotreating reactor 18 includes a fluidized bed reactor 62 and a regenerator 64. The regenerator 64 connects and/or passed to the fluidized bed reactor 62 by a coked catalyst stream 68 (send line) and a decoked catalyst stream 70 (return line). The regenerator 64 connects and/or passes to a regenerating material stream 66, such as for removing coke by hydrogen, oxygen, water, steam, and/or the like. A hydrogen stream 32 includes both a make-up hydrogen stream 34 and a recycle hydrogen stream 36. Optionally, the recycle hydrogen stream 36 can connect and/or pass to a carbon oxide removal system 46 and form and/or separate a carbon oxide steam 48.

According to one embodiment, the invention can include a method and/or a process of hydrotreating hydrocarbons. The method can include the step of feeding a mineral oil based hydrocarbon stream to a hydrotreating unit under hydrotreating conditions and with a hydrotreating catalyst to form a hydrotreated product stream, and the step of measuring a sulfur content of the hydrotreated product stream. The method can also include the step of starting co-feed of a biological oil based hydrocarbon stream to the hydrotreating unit, and the step of measuring the sulfur content of the hydrotreated product stream during co-feed. The method can also include the step of stopping co-feed of the biological oil based hydrocarbon stream upon the sulfur content of the hydrotreated product stream reaching a predetermined value, and the step of measuring the sulfur content of the hydrotreated product stream after stopping co-feed. Upon termination of the co-feed, the sulfur content of the hydrotreated product stream returns to a value of close to (about) before the co-feed of the sulfur content of the hydrotreater effluent after the step of stopping co-feed.

Hydrotreating broadly refers to processes and/or steps to remove and/or reduce impurities or heteroatoms from a molecule and/or a compound, such as by reaction with one or more hydrogen atoms. Hydrotreating can remove and/or reduce sulfur content (hydrodesulfurization), nitrogen content (hydrodenitrogenation), oxygen content (hydrodeoxygenation), aromatic content (hydrodearomatization), metal content (hydrodemetalization), double bonds (saturation or hydrogenation), triple bonds (saturation or hydrogenation), and/or the like. Hydrotreating can also include processes known as hydrofining, hydrofinishing, hydrocracking, and/or the like.

Hydrocarbon broadly refers to any suitable compound containing predominantly and/or mostly carbon and hydrogen, such as may be derived from renewable and/or nonrenewable resources. Sources of hydrocarbons may include, but are not limited to, crude oil, petroleum, natural gas, coal, peat, tar sands, shale, bitumen, synthetic processes, plants, animals, fungi, yeasts, microorganisms, and/or the like.

Feeding broadly refers to moving, pumping, spraying, sparging, supplying, and/or the like.

Stream broadly refers to a flow, a quantity, a volume, a mass, and/or the like. Unit broadly refers to devices and/or apparatuses, such as used to affect a change and/or accomplish a task.

Mineral oil based broadly refers to materials and/or substances derived at least in part from the Earth, such as fossil fuels. Mineral oil may come from any suitable source, such as natural gas, crude oil, petroleum, coal, peat, shale, tar sands, bitumen, other geologic formations, and/or the like. According to one embodiment, mineral oil based excludes living and/or recently living organisms.

Hydrotreating unit broadly refers to suitable devices and/or apparatuses used in hydrotreating a stream and/or a material, such as pumps, compressors, pipes, valves, reactors, vessels, furnaces, heat exchangers, distillation columns, separators, control systems, and/or the like. According to one embodiment, the hydrotreating unit includes a trickle bed reactor, or a fluidized bed reactor.

Hydrotreating conditions broadly refer to any suitable conditions or physical circumstances for carrying out a hydrotreating reaction. Hydrotreating conditions may include a pressure of between about atmospheric and about 2000 bars, and/or the like. Hydrotreating conditions may include a temperature of between about 100 degrees Celsius and about 1,000 degrees Celsius, at least about 275 degrees Celsius, and/or the like. Hydrotreating conditions may include and/or exclude a catalytic material.

Hydrotreating catalysts broadly refer to any suitable substance and/or material to increase a rate of a hydrotreating reaction. Catalysts can be supported and/or unsupported. Catalysts can be in any suitable size and/or shape, such as powders, granules, pellets, engineered shapes, and/or the like. Generally, but not necessarily, catalysts can be based on one or more metals and/or metal compounds, such as cobalt, molybdenum, nickel, iron, platinum, palladium, ruthenium, rhenium, other transition metals, other precious metals, and/or the like.

Product broadly refers to a material and/or a substance that has undergone at least a partial change and/or transformation, such as from a separation and/or a reaction.

Measuring broadly refers to quantifying, analyzing, appraising, determining a content of, and/or the like. Any suitable analytical and/or laboratory techniques may be use for measuring, such as spectroscopy, x-ray fluorescence, gas chromatography, liquid chromatography, mass spectroscopy, calorimetry, titration, and/or the like. Any suitable molecule and/or compound can be measured, such as sulfur, oxygen, nitrogen, metals, and/or the like. Measuring can be done at any suitable frequency and/or time interval, such as generally continuously, about once per second, about once per minute, about once per hour, about three times a day, about two times per day, about one time per day, about once for every other day, about once per week, and/or the like.

Sulfur in a product stream broadly refers to both elemental sulfur and sulfur species in other forms, such as thiophenes, disulfides, thiols, mercaptans, sulfur oxides, hydrogen sulfide, higher molecular weight compounds, and/or the like. The sulfur may include any suitable amount, such as between about 0.01 parts per million and about 1,000 parts per million, less than about 500 parts per million, less than about 100 parts per million, less than about 50 parts per million, less than about 10 parts per million, less than about 5 parts per million, less than about 1 part per million, and/or the like on a mass basis.

Starting broadly refers to beginning and/or commencing a step and/or an operation.

Co-feed broadly refers to feeding at substantially the same time and/or conditions as a first item, stream, and/or component.

Biological oil based broadly refers to materials and/or substances derived at least in part from living and/or recently living organisms and/or processes, such as from plants, animals, vertebrates, invertebrates, microorganisms, algae, yeast, fungi, bacteria, cyanobacteria, and/or the like. Biological oil production and/or growth can include fixation of atmospheric carbon dioxide through photosynthesis, associated biochemical processes, and/or the like. According to one embodiment, biological oil can be derived from naturally occurring organisms and/or genetically modified organisms. Suitable sources of biological oil may include palm oil, olive oil, rapeseed oil, soybean oil, coconut oil, corn oil, jatropha oil, tallow (animal fat, such as beef, chicken, pork, and/or the like), and/or the like. Biological oil based streams and/or materials may include sulfur compounds, nitrogen compounds, oxygen compounds, and/or the like. According to one embodiment, biological oil based excludes fossilized materials.

According to one embodiment, the biological oil based hydrocarbon stream can include fatty acids, pyrolysis oils, liquefaction oils, acyl glycerides, and/or the like. Acyl glycerides can include monoglycerides, diglycerides, trigylcerides, and/or the like.

Stopping broadly refers to ending and/or halting a step and/or an operation.

Predetermined broadly refers to arrived at beforehand and/or ahead of time, such as before the current step. The predetermined level or threshold level can be any suitable amount and/or level, such as based on product specifications, blending stock availability, and/or the like. The predetermined value may include between about 0.1 parts per million and about 10,000 parts per million, between about 1 part per million and about 1,000 parts per million, less than about 500 parts per million, less than about 100 parts per million, less than about 50 parts per million, less than about 10 parts per million, and/or the like on a mass basis.

Close to broadly refers to any suitable number and/or range around an initial and/or target value, such as a value of plus or minus about 1,000 parts per million, plus or minus about 500 parts per million, plus or minus about 100 parts per million, plus or minus about 50 parts per million, plus or minus about 20 parts per million, plus or minus about 10 parts per million, plus or minus about 5 parts per million, and/or the like on a mass basis.

According to one embodiment, a value of close to can include between about 30 percent and about 300 percent, between about 50 percent and about 150 percent, between about 80 percent and about 120 percent, between about 90 percent and about 110 percent of an initial value, such as the sulfur content of before the starting co-feed.

A ratio of time with the co-feed to the hydrotreating unit to time without the co-feed may include any suitable amount, such as between about 0.01 to about 100, between about 0.2 to about 5, between about 0.4 to about 2.5, and/or the like.

A duration and/or a period of coprocessing (campaign) may be for any suitable length of time, such as at least about 8 hours, at least about 1 day, at least about 2 days, at least about 5 days, at least about 7 days, at least about 10 days, at least about 14 days, at least about 21 days, at least about 30 days, at least about 1 month, at least about 3 months, and/or the like.

The biological oil based hydrocarbon stream may form any suitable amount of a feed to the hydrotreating unit, such as between about 0 weight percent and about 100 weight percent, between about 0.1 weight percent and about 80 weight percent, between about 1 weight percent and about 50 weight percent, about 30 weight percent, about 5 weight percent, and/or the like of a feed to the hydrotreating unit. According to one embodiment, the mineral oil based hydrocarbon stream stops during co-feed. According to one embodiment, the biological oil based hydrocarbon stream does not stop, but an amount and/or a flow can be varied.

Embodiments with the main feed being biological oil based hydrocarbon streams and the co-feed being mineral oil based hydrocarbon streams are within the scope of this invention.

The method can include any suitable rate of initial increase in sulfur content of the hydrotreated product, such as the initial increase has a slope of between about 2 times and about 12 times greater than a slope of the continuing increase, and/or the like. Embodiments with where the co-feed causes no increase in sulfur content of the product are within the scope of this invention. Similarly, embodiments with where the co-feed reduces sulfur content of the product are within the scope of this invention.

The method may include the steps recited above in the order and/or frequency recited above, such as in a sequence and/or a progression of steps, according to one embodiment. In the alternative, the steps may be reordered and/or repeated as beneficially desired.

According to one embodiment, the invention can include a hydrotreating unit for processing mineral oil based hydrocarbon streams, biological oil based hydrocarbon streams, and/or the like. The unit can include a first hydrotreating reactor for receiving a mineral oil based hydrocarbon stream and forming a first hydrotreated product stream, and a second hydrotreating reactor for receiving a biological oil based hydrocarbon stream and forming a second hydrotreated product stream. This configuration can form a parallel processing arrangement, such as a separate train and/or reactor system for mineral oil based hydrocarbon streams from biological oil based hydrocarbon streams.

Other combinations of series and/or parallel hydrotreating reactors are within the scope of this invention, such as a first reactor (hydrodesulfurization) on mineral oil in series with a second reactor (deoxygenation) on bio-oil diluted with a first reactor effluent. Make-up hydrogen could be added to the first reactor and/or the second reactor. Purging and/or scrubbing can be done after the first reactor (between) and/or after the second reactor depending upon the configuration, catalyst choices for the reactors, and/or the like.

Reactor broadly refers to a vessel, an apparatus and/or the like for at least one chemical reaction to take place within, such as upon contacting with a catalyst. The reactor may include any suitable configuration, such as a packed bed, multiple beds, a trickle bed, an upflow reactor, a downflow reactor, a fluidized bed reactor, and/or the like.

According to one embodiment, a common hydrogen stream supplies both the first hydrotreating reactor and the second hydrotreating reactor, and the hydrogen stream includes make-up (fresh) hydrogen and recycle (used) hydrogen. This configuration offers parallel processing of the hydrocarbon streams but a single hydrogen system.

A ratio of the make-up hydrogen to the recycle hydrogen can include any suitable value and/or amount, such as between about 1 to 100, between about 100 to 1, about 1:10, and/or the like on a mass basis, a mole basis, and/or a volume basis.

According to one embodiment, a make-up (fresh) hydrogen stream connects to the second hydrotreating reactor (biological oil based) and a recycle (used) hydrogen stream connects to the first hydrotreating reactor (mineral oil based). This configuration allows processing of the biological oil based hydrocarbon steam with make-up hydrogen, such as without carbon oxide impurities, sulfur impurities, and/or the like.

According to one embodiment, a make-up (fresh) hydrogen stream connects to the first hydrotreating reactor (mineral oil based) and a recycle (used) hydrogen stream connects to the second hydrotreating reactor (biological oil based). This configuration allows processing the mineral oil based hydrocarbon stream with make-up hydrogen, such as without carbon oxide impurities, water, and/or the like.

Other combinations of hydrogen configurations and reactors are within the scope of this invention.

According to one embodiment, the first hydrotreating reactor may include a cobalt and molybdenum catalyst and the second hydrotreating reactor may include a nickel and molybdenum catalyst. Other combinations of different types of catalysts and reactors are within the scope of this invention. This configuration allows optimizing catalyst for each service and/or duty that is it in.

According to one embodiment, the unit can include a carbon dioxide removal system on a hydrogen recycle stream. The carbon dioxide removal system may remove and/or reduce an amount of carbon dioxide in the hydrogen recycle stream. The carbon dioxide may be formed from the processing of the biological oil based hydrocarbon stream with oxygen containing species and/or compounds. The carbon dioxide removal system may include any suitable device and/or apparatus, such as absorption systems, adsorption systems, solvent systems, reactive solutions (hot potassium carbonate, for example), and/or the like. The carbon dioxide removal system can remove any suitable amount of carbon dioxide in the hydrogen recycle stream before the removal system, such as at least about 1 percent, at least about 30 percent, at least about 70 percent, at least about 90 percent, at least about 95 percent, and/or the like on a volume basis and/or a mole basis.

According to one embodiment, the invention may include a method of hydrotreating hydrocarbons. The method may include the step of feeding a mineral oil based hydrocarbon stream to a hydrotreating unit under hydrotreating conditions in the presence of a hydrotreating catalyst to form a hydrotreated product stream. The method may also include the step of measuring a sulfur content of the hydrotreated product stream, and the step of starting co-feed of a biological oil based hydrocarbon stream to the hydrotreating unit. The method may also include the step of measuring the sulfur content of the hydrotreated product stream during co-feed, and the step of stopping co-feed of the biological oil based hydrocarbon stream upon the sulfur content of the hydrotreated product stream reaching a predetermined value to effect a reduction in sulfur content of the hydrortreated product stream such that the sulfur content returns to a value close to the value prior to terminating the co-feed.

The scope of this invention also includes methods of operating a hydrotreating unit with a first hydrotreating reactor and a second hydrotreating reactor.

According to one embodiment, this invention can include a hydrotreating unit for processing mineral oil based hydrocarbon streams, biological oil based hydrocarbon streams, and/or the like. The unit can include a hydrotreating reactor for receiving a feed stream and forming a hydrotreated product stream, and a hydrogen recycle system for separating and returning unconverted hydrogen to the hydrotreating reactor as a hydrogen recycle stream. The unit can include a carbon oxide removal system for removing at least a portion of carbon oxides from the hydrogen recycle stream.

Carbon oxides broadly refer to compounds and/or substances containing primarily carbon and oxygen, such as carbon monoxide, carbon dioxide, and/or the like. Carbon oxides may be generated, formed, and/or released from the processing of biological oil based hydrocarbon streams, such as may contain oxygen. Without being bound by theory of operation, carbon oxides may slow down and/or inhibit hydrotreating reactions, such as may allow an increase in product sulfur content (slip).

The carbon oxide removal system may include any suitable device and/or apparatus, such as to reduce and/or remove at least a partial carbon oxide content of a hydrogen recycle stream. Carbon oxide removal systems may use reactions, separations, other unit operations, and/or the like.

According to one embodiment, the carbon oxide removal system may include a carbon dioxide absorption system, such as a caustic scrubber, a water scrubber, an amine scrubber, a solvent based contactor, a potassium carbonate absorber, a pressure swing adsorption vessel, a temperature swing adsorption vessel, a membrane containing vessel, a carbonate trap, a cold trap, and/or the like.

Additionally and/or alternatively, the carbon oxide removal system may include a water-gas shift reactor, such as to convert carbon monoxide to carbon dioxide. Water-gas shift reactors may include a suitable catalyst and can operate at any suitable temperature, such as high temperature shift converters, low temperature shift converters, and/or the like.

Additionally and/or alternatively, the carbon oxide removal system may include a methanation reactor, such as to convert carbon oxides to methane with hydrogen.

According to one embodiment, the hydrotreating reactor may include more than one catalyst bed with an interbed purge for each bed each, such as to purge and/or remove at least a portion of carbon oxides in the effluent streams from each bed. The interbed purge can be in fluid communication with the carbon oxide removal system. A separate hydrogen stream may be supplied to each bed of the hydrotreating reactor. The separate hydrogen stream may include make-up hydrogen, recycle hydrogen, and/or the like.

According to one embodiment, the hydrotreating reactor may include a fluidized bed reactor and/or an ebullated bed reactor. The fluidized bed reactor may be up flow and/or down flow. Desirably, the fluidized bed reactor may include a regenerator, such as for decoking catalyst from the fluidized reactor. The regenerator may operate in any suitable mode and/or manner. The regenerator may decoke the catalyst with any suitable method and/or equipment, such as decoking with hydrogen addition, oxygen addition, steam addition, and/or the like.

Figure 8:
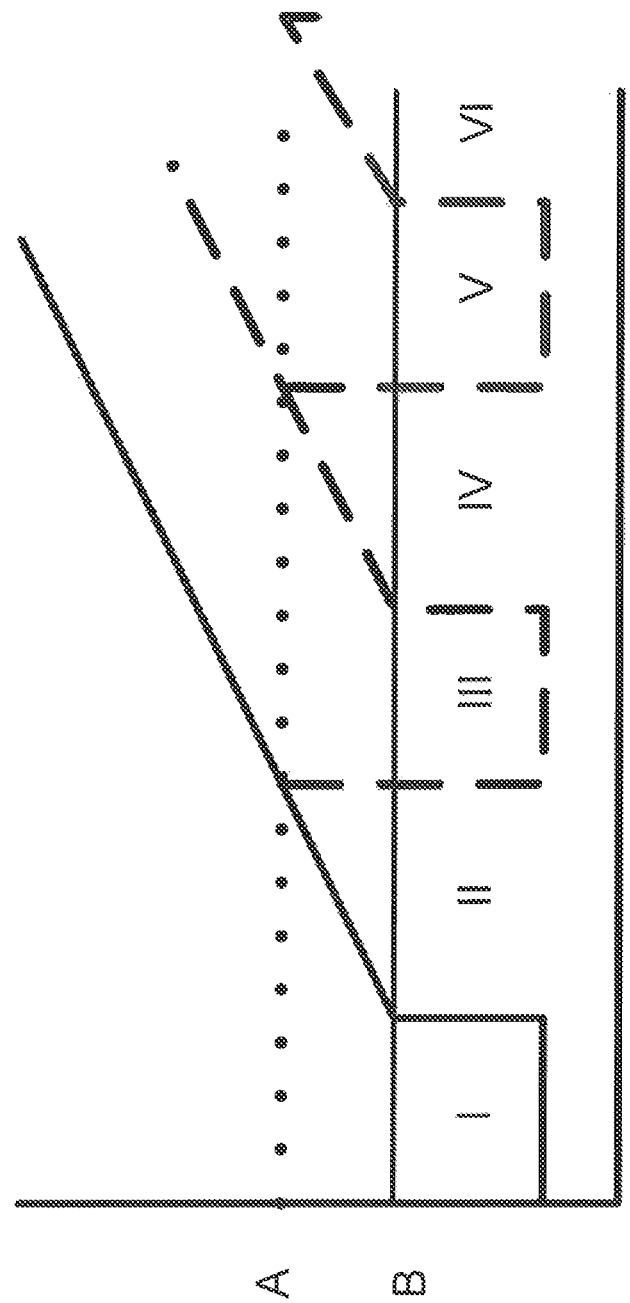
FIG. 8 shows a graph of time versus product sulfur level content, according to one embodiment.

According to one embodiment, managing loss of catalyst activity can include campaigning different feedstocks during operation of the catalyst for optimization of commercial performance of a unit. Essentially, reverting back to mineral oil feed can provide recovery of lost performance. FIG. 8 shows schematically the potential benefit of campaigning natural oil or fat coprocessing over continuous operation. The x-axis represents time and the y-axis represents sulfur values in the product. The campaigning of bio-oil produces an elongated run with a saw toothed sulfur curve instead of continued elevation of sulfur levels (shown as extended sloped lines). In FIG. 8, letter A represents a managed deactivation limit and/or a predetermined sulfur value in the product. Letter B represents an initial inhibition, such as increased sulfur value with coprocessing of bio-oil. Regions I, III, and V correspond to periods of operation on mineral and/or petroleum feed (no bio-oil). Regions II, IV, and VI correspond to periods of operation with bio-oil coprocessing. Any suitable number of cycles of operation are within the scope of this invention.

EXAMPLES

Example 1

An experiment was conducted in a pilot plant hydrotreater by co-feeding 30 weight percent tallow and 30 weight percent octanol in a light gas oil feed over a presulfided cobalt molybdenum catalyst on an alumina support. The pressure was 30 bars and the temperature was 343 degrees Celsius. The reactor operated with a liquid hourly space velocity of 2, Days 1 to 10 of operation were used to line out the system on light gas oil. Days 10 to 20 were stable operation on the light gas oil. Days 20 to 30 were operated on 70 weight percent light gas oil and 30 weight percent tallow. Days 30 to 40 were operated on light gas oil. Days 40 to 50 were operated on 70 weight percent light gas oil and 30 weight percent octanol. Days 50 to 60 were operated on light gas oil. Sulfur concentrations were measured for the liquid product as shown in FIG. 9.

Figure 9:
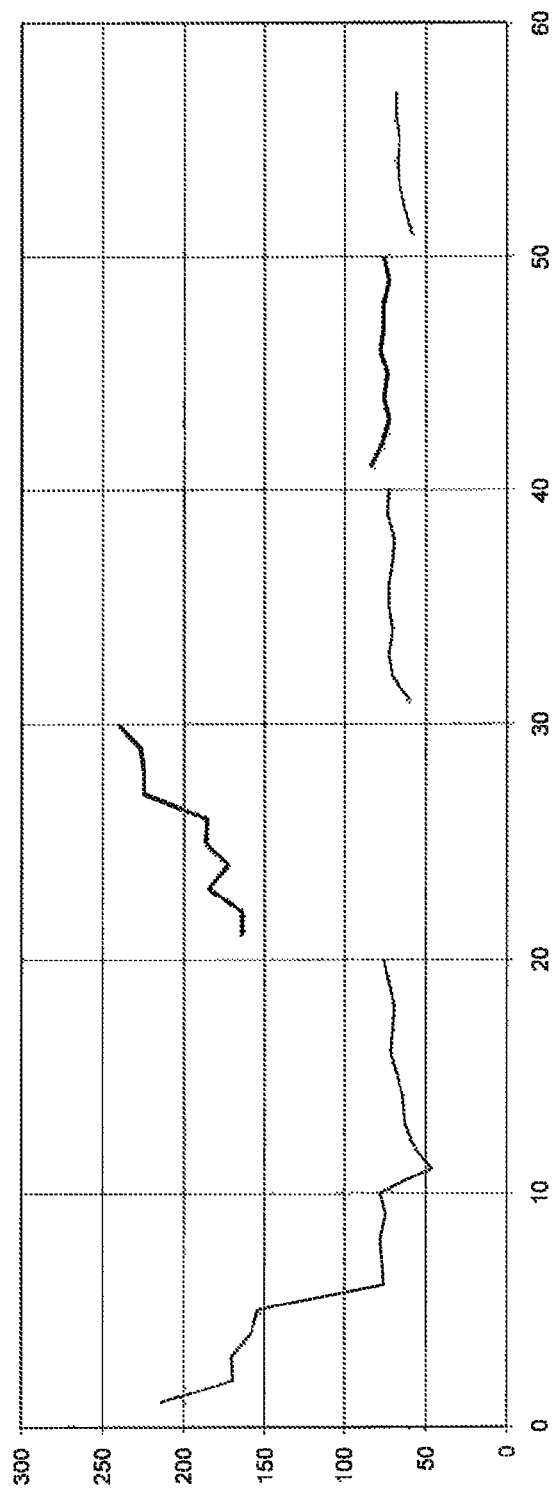
FIG. 9 shows a graph of time versus product sulfur level content, according to one embodiment.

FIG. 9 shows time in days on the x-axis and sulfur content in the liquid product in parts per million on a mass basis on the y-axis. FIG. 9 shows that after the initial line out (days 1 to 10), there was stable operation and sulfur removal performance (days 10 to 20), until the tallow feed (days 20 to 30). With the commencement of the tallow feed, there occurred a step change deterioration in the performance of the catalyst (increased sulfur content), followed by a continued loss of desulfurization performance. FIG. 9 also shows that upon stopping the tallow co-feed (days 30 to 40), the product sulfur level returned to or close to prior levels. Octanol feed (days 40 to 50) did not produce as much of an increase in product sulfur content as did the tallow. Upon return to light gas oil feed (days 50 to 60), the sulfur content remained low and stable.

Example 2

Figure 10:
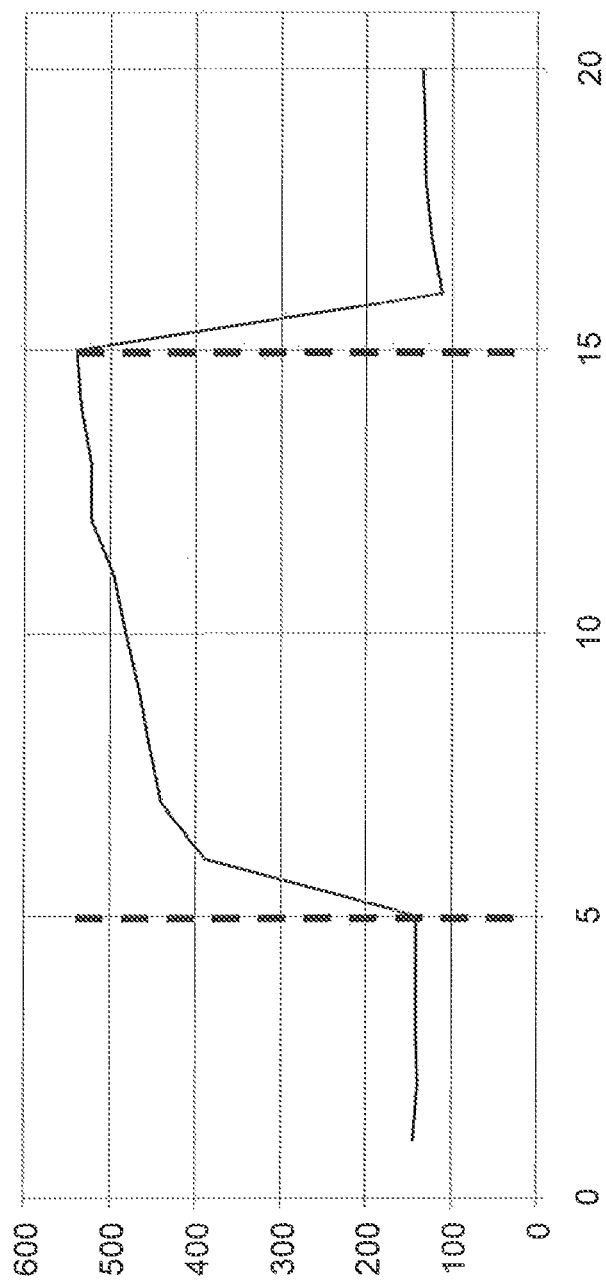
FIG. 10 shows a graph of time versus product sulfur level content, according to one embodiment.

Another experiment was performed with rape seed oil to show the effect rape seed oil on the inhibition of the desulfurization process. The experiment was similar to Example 1 except the temperature was 363 degrees Celsius. The addition of rape seed oil had a similar effect as with tallow on product sulfur content. There was initially a step decrease in the performance of the cobalt molybdenum catalyst for sulfur removal followed by a continual loss of performance with further exposure to the natural oil or fat. When the rape seed oil was removed from the feed the performance returned to the level before the exposure, as shown in FIG. 10. FIG. 10 shows time in days on the x-axis and sulfur content in the liquid product in parts per million on a mass basis on the y-axis. Days 5 to 15 correspond to a period of 30 weight percent rapeseed oil coprocessing.

Example 3

Figure 11:
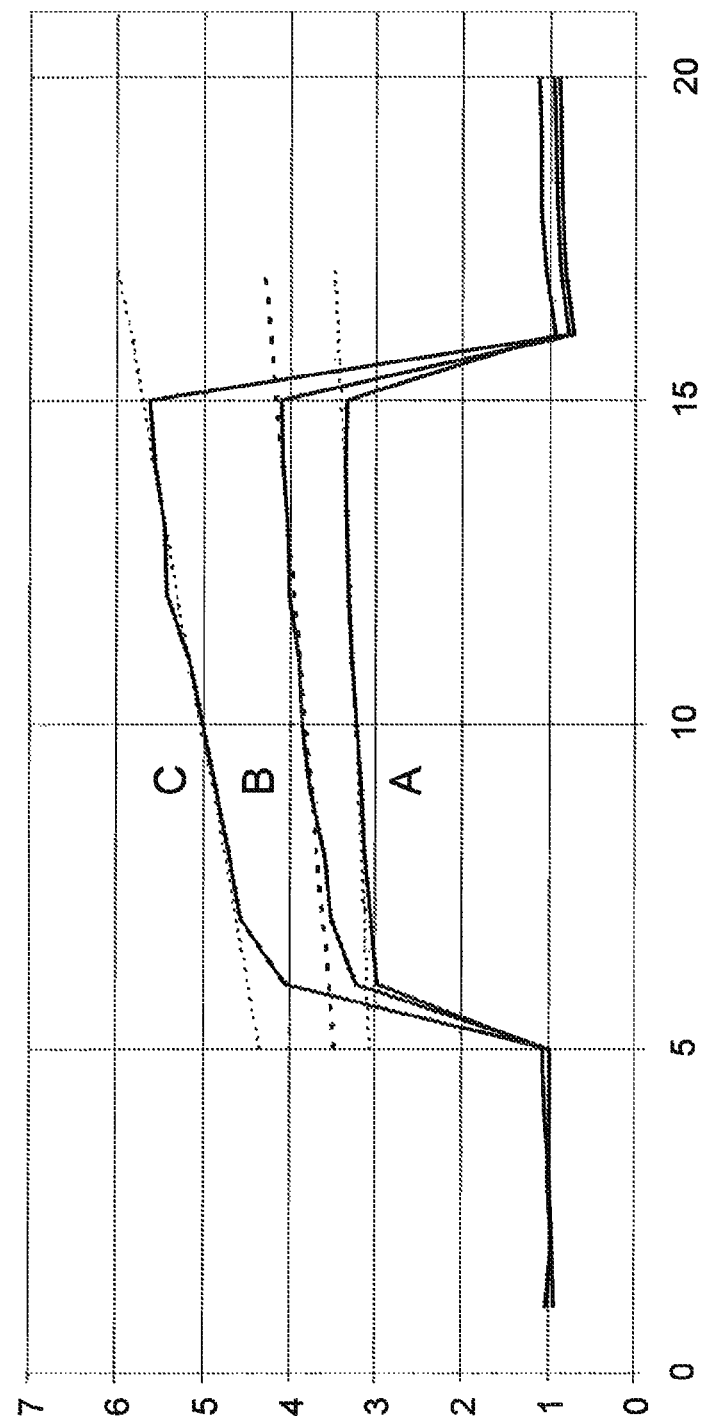
FIG. 11 shows a graph of time versus a ratio of product sulfur level content, according to one embodiment.
Figure 13:
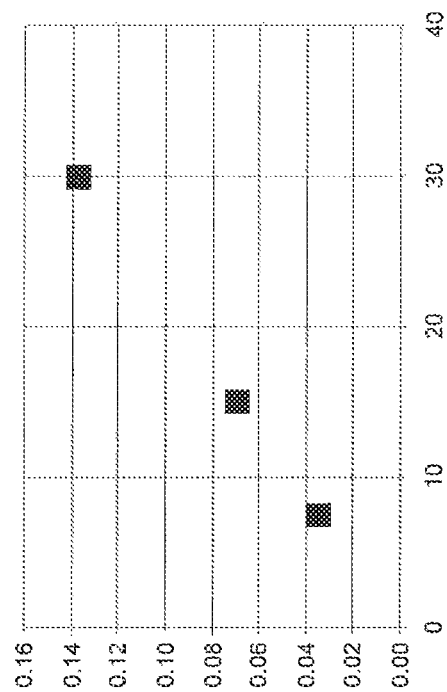
FIG. 13 shows graph of rape seed oil content versus a ratio of product sulfur level content, according to one embodiment.
Figure 12:
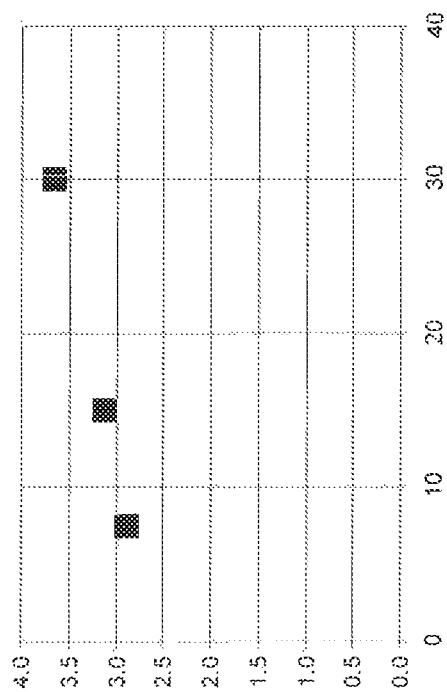
FIG. 12 shows graph of rape seed oil content versus a ratio of product sulfur level content, according to one embodiment.

In another set of experiments the effect of the level of rape seed oil on the inhibition of the desulfurization process was explored. As shown in FIGS. 11, 12, and 13, it was observed that that the different levels of rape seed oil had similar effects on the initial increase of hydrodesulfurization inhibition, but the rate of at which inhibition continues to increase is proportional to rape seed oil content. FIG. 11 shows time in days on the x-axis and a ratio of sulfur content in the product with the rape seed oil to sulfur content in the product with the light gas oil for 7.5 weight percent rape seed oil (A), 15 weight percent rape seed oil (B), and 30 weight percent rape seed oil (C). Days 5 to 15 correspond to a period of rapeseed oil coprocessing.

Doubling the pressure to 60 bars with 7.5 weight percent rape seed oil (not shown) produced essentially and/or substantially the same results as the 7.5 weight percent rape seed oil at 30 bars (A). FIG. 12 shows rape seed oil content on the x-axis and initial inhibition (ratio of sulfur content in products of FIG. 11) on the y-axis. FIG. 13 shows rape seed oil content on the x-axis and continued inhibition (ratio of sulfur content in products of FIG. 11) on the y-axis. In all cases, when the feed was reverted to a base petroleum feedstock, the catalyst performance recovered.

While the specification has been drafted in terms of mineral based oil hydrocarbon streams and biological oil based hydrocarbon streams, a person of skill in the art readily appreciates that the methods and apparatuses disclosed herein may have utility regarding other processing applications and/or materials, such as hydrotreating chemical intermediates with heteroatoms, synthetic materials, and/or the like.

As used herein the terms "having", "comprising", and "including" are open and inclusive expressions. Alternately, the term "consisting" is a closed and exclusive expression. Should any ambiguity exist in construing any term in the claims or the specification, the intent of the drafter is toward open and inclusive expressions.

Regarding an order, number, sequence, and/or limit of repetition for steps in a method or process, the drafter intends no implied order, number, sequence and/or limit of repetition for the steps to the scope of the invention, unless explicitly provided.

Regarding ranges, ranges are to be construed as including all points between the upper and lower values, such as to provide support for all possible ranges contained between the upper and lower values including ranges with no upper bound and/or lower bound.

It will be apparent to those skilled in the art that various modifications and variations can be made in the disclosed structures and methods without departing from the scope or spirit of the invention. Particularly, descriptions of any one embodiment can be freely combined with descriptions or other embodiments to result in combinations and/or variations of two or more elements or limitations. Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. A method for hydrotreating mineral oil based hydrocarbon streams, biological oil based hydrocarbons streams, and combinations thereof, the method comprising:
   delivering a feedstock comprising a mineral oil based hydrocarbon stream to a first hydrotreating reactor and forming a first hydrotreated product stream; and
   delivering a feedstock consisting of a biological oil based hydrocarbon stream to a second hydrotreating reactor and forming a second hydrotreated product stream.

2. The method of claim 1, wherein a common hydrogen stream supplies both the first hydrotreating reactor and the second hydrotreating reactor, and the hydrogen stream comprises make-up hydrogen and recycle hydrogen.

3. The method of claim 1, wherein a make-up hydrogen stream connects to the second hydrotreating reactor and a recycle hydrogen stream connects to the first hydrotreating reactor.

4. The method of claim 1, wherein a make-up hydrogen stream connects to the first hydrotreating reactor and a recycle hydrogen stream connects to the second hydrotreating reactor.

5. The method of claim 1, wherein the first hydrotreating reactor comprises a cobalt and molybdenum catalyst, and the second hydrotreating reactor comprises a nickel and molybdenum catalyst.

6. The method of claim 1, further comprising a carbon dioxide removal system on a hydrogen recycle stream.

\* \* \* \* \*